United States Patent
Welck

(10) Patent No.: US 12,494,143 B2
(45) Date of Patent: *Dec. 9, 2025

(54) IMMERSIVE DIGITAL DESKTOP DISPLAY SYSTEM

(71) Applicant: Steven A. Welck, Gardenville, NV (US)

(72) Inventor: Steven A. Welck, Gardenville, NV (US)

(73) Assignee: Steven A. Welck, Gardenville, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/752,759

(22) Filed: Jun. 24, 2024

(65) Prior Publication Data

US 2024/0346970 A1 Oct. 17, 2024

Related U.S. Application Data

(63) Continuation of application No. 17/882,453, filed on Aug. 5, 2022, now Pat. No. 12,020,609, which is a continuation of application No. 17/736,094, filed on May 4, 2022, now abandoned.

(51) Int. Cl.
| | |
|---|---|
| *G09G 3/00* | (2006.01) |
| *G06F 1/16* | (2006.01) |
| *G06F 3/14* | (2006.01) |
| *G09G 3/3208* | (2016.01) |

(52) U.S. Cl.
CPC ............ *G09G 3/03* (2020.08); *G06F 1/1601* (2013.01); *G06F 3/1446* (2013.01); *G09G 3/3208* (2013.01); *G09G 2300/026* (2013.01)

(58) Field of Classification Search
CPC ........ G09G 3/03; G09G 3/035; G09G 3/3208; G09G 2380/02; G09G 2300/026; G09G 2354/00; G06F 1/1652; G06F 1/1601; G06F 3/1446
See application file for complete search history.

(56) References Cited

U.S. PATENT DOCUMENTS

| | | | |
|---|---|---|---|
| 8,342,462 B2 | 1/2013 | Sapper et al. | |
| 2003/0231460 A1 | 12/2003 | Moscovitch | |
| 2006/0238967 A1* | 10/2006 | Carson | B60R 11/0235 361/679.04 |
| 2014/0118910 A1* | 5/2014 | Sung | G02F 1/133305 361/679.01 |

(Continued)

OTHER PUBLICATIONS

United States Patent and Trademark Office, U.S. Appl. No. 17/736,094, Non-Final Office Action dated Oct. 12, 2022.

(Continued)

*Primary Examiner* — Xuemei Zheng
(74) *Attorney, Agent, or Firm* — Shield Intellectual Property PC; Kirk D. Wong

(57) ABSTRACT

An immersive digital desktop display includes a frame that incorporates an inner display mount surface that has a curvature of a rectangular spherical segment or a rectangular toric segment based on a set user viewing distance. An emissive display panel can be a backplane having a plurality of LED display panels, a moldable backplane emissive sheet, a flexible emissive display sheet, etc. The emissive display panel is mounted to the inner mounting surface of the conformal frame.

16 Claims, 31 Drawing Sheets

(56) References Cited

U.S. PATENT DOCUMENTS

| | | | |
|---|---|---|---|
| 2016/0165196 A1* | 6/2016 | Gocke | H04N 9/3147 |
| | | | 359/446 |
| 2018/0054612 A1* | 2/2018 | Kim | G09G 5/003 |
| 2019/0333424 A1* | 10/2019 | Zhu | G09F 9/33 |
| 2020/0337160 A1 | 10/2020 | Hsiao | |
| 2022/0043489 A1* | 2/2022 | Yao | G06F 1/1601 |
| 2022/0093016 A1* | 3/2022 | Gimbler | F16M 11/126 |
| 2022/0223075 A1* | 7/2022 | Huang | G09F 9/301 |
| 2023/0360572 A1 | 11/2023 | Welck | |

OTHER PUBLICATIONS

United States Patent and Trademark Office, U.S. Appl. No. 17/882,453, Final Office Action dated Feb. 9, 2023.
United States Patent and Trademark Office, U.S. Appl. No. 17/882,453, Non-Final Office Action dated Oct. 28, 2022.
United States Patent and Trademark Office, U.S. Appl. No. 17/882,453, Non-Final Office Action dated Jul. 25, 2023.
United States Patent and Trademark Office, U.S. Appl. No. 17/882,453, Notice of Allowance dated Jan. 30, 2024.
Vivo, https://www.youtube.com/watch?y=paetc_Qhuas (Year: 2020).

\* cited by examiner

IMMERSIVE DIGITAL DESKTOP DISPLAY SYSTEM

CROSS-REFERENCE TO RELATED APPLICATIONS

This application claims benefit as a Continuation of application Ser. No. 17/882,453, filed Aug. 5, 2022, which is a Continuation of application Ser. No. 17/736,094, filed May 4, 2022, the entire contents of the foregoing are hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

Embodiments relate generally to digital display systems, and, more specifically, to techniques for incorporating digital displays into immersive desktop display systems.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Current desktop display monitors, gaming monitors, and consumer televisions are traditionally planar in form. Recent display manufacturers have produced desktop display monitors, gaming monitors, and consumer televisions that are slightly curved on the Z axis. This curvature slightly assists the user in viewing the edges of large desktop display monitors. The attempt is to keep at least part of the edge of the screen in the user's peripheral vision and to compensate for the viewing angle limitations of current OLED and other emissive display types such that the edges of the screen resolve well to the viewer. The user will have less eye focus and recognition time with the slight curvature versus scanning a planar surface which requires many different focal points for a large desktop display monitor. However, the apparent benefit that the curvature offers falls short of its goal. Users must still refocus their eyes in order to scan the peripheral areas of the desktop display monitor.

BRIEF DESCRIPTION OF DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
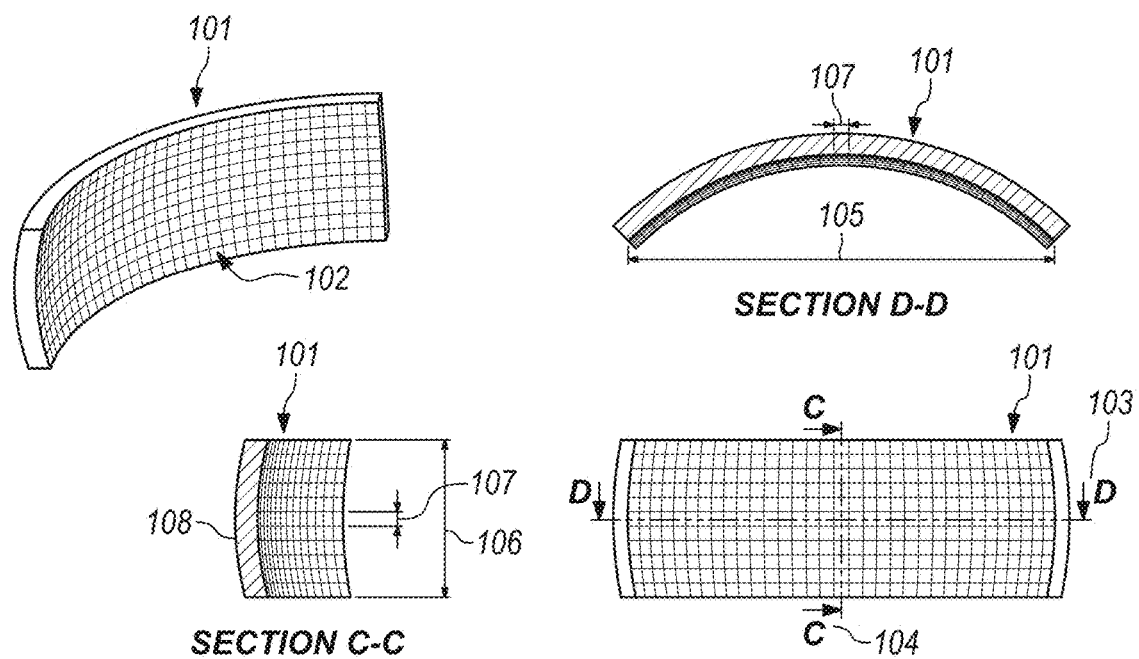
FIG. 1 illustrates 3D perspective views of an immersive digital desktop display, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0. General Overview
2.0. Structural Overview
   2.1 Immersive Digital Desktop Display
   2.2 Immersive Digital Desktop Display content production
3.0. Extensions and Alternatives

1.0. General Overview

Approaches, techniques, and mechanisms are disclosed for immersive digital display systems and spherical and hemispherical digital dome display systems.

Immersive desktop digital displays are described herein with the flexibility to customize display sizes to adapt to different applications.

Computer displays are ubiquitous in society because the use of computer systems has become an integral part of the social and professional lives of people and encompasses all ages groups. Tasks such as video conferencing are now daily tasks where company employees communicate with fellow employees via video conferencing rather than personal interchange. School systems have incorporated distance learning into their curriculum to the point of having Kindergarten students video conference into a virtual classroom.

The problem with desktop computer displays is that a majority of the displays are planar. This causes many problems for the user. Even the introduction of displays with a slight curve on the Z-axis have not solved any of the problems. Digital eye strain (DES), also known as computer vision syndrome, encompasses a range of ocular and visual symptoms, and estimates suggest its prevalence may be 50% or more among computer users. According to the American Optometric Association, digital eye strain encompasses a wide range of symptoms. In addition to visual fatigue, digital eye strain also includes symptoms such as:
Headaches
Blurred Vision
Dry Eyes
Neck and Shoulder Pain Desktop digital displays should reflect nature more than force users to adapt to the display itself. This means that when the user looks forward at the display, the user should not have to constantly refocus his vision in order to look at other areas of the display. An embodiment of the invention creates a more natural experience for the user. The embodiment provides the user with a viewing experience such that the user's eyes view the entire display at nearly the same distance thereby providing maximum eye relief. Optimal viewing occurs on or near the center radius of the display creating a point of view (POV) envelope more natural to the eyes. This provides eye relief near but not limited to the exact center radius point of the display. This approach is called an immersive digital desktop display. For power users immersed in their job tasks for hours each day, an immersive digital desktop display makes work easier on their eyes and their body, which will in turn make them more productive and ready to get to work each day. The immersive digital desktop display:
Improves Human Perception
Enhances Situational Awareness
Advances VR/AR/MR/XR Platforms
Supports Processing and Exploitation of Information
Promotes Collaboration in Shared Environments
Has Modular Scalability

2.0. Structural Overview 2.1 Immersive Digital Desktop Display

In an embodiment, an immersive digital desktop display exploits OLED, AMOLED, PLED, PMOLED, MicroLED, and other related technologies, in order to create an immersive digital desktop display that is curved in three dimensions in sphericity. The curvature follows a spherical segment or toric form.

Figure 7:
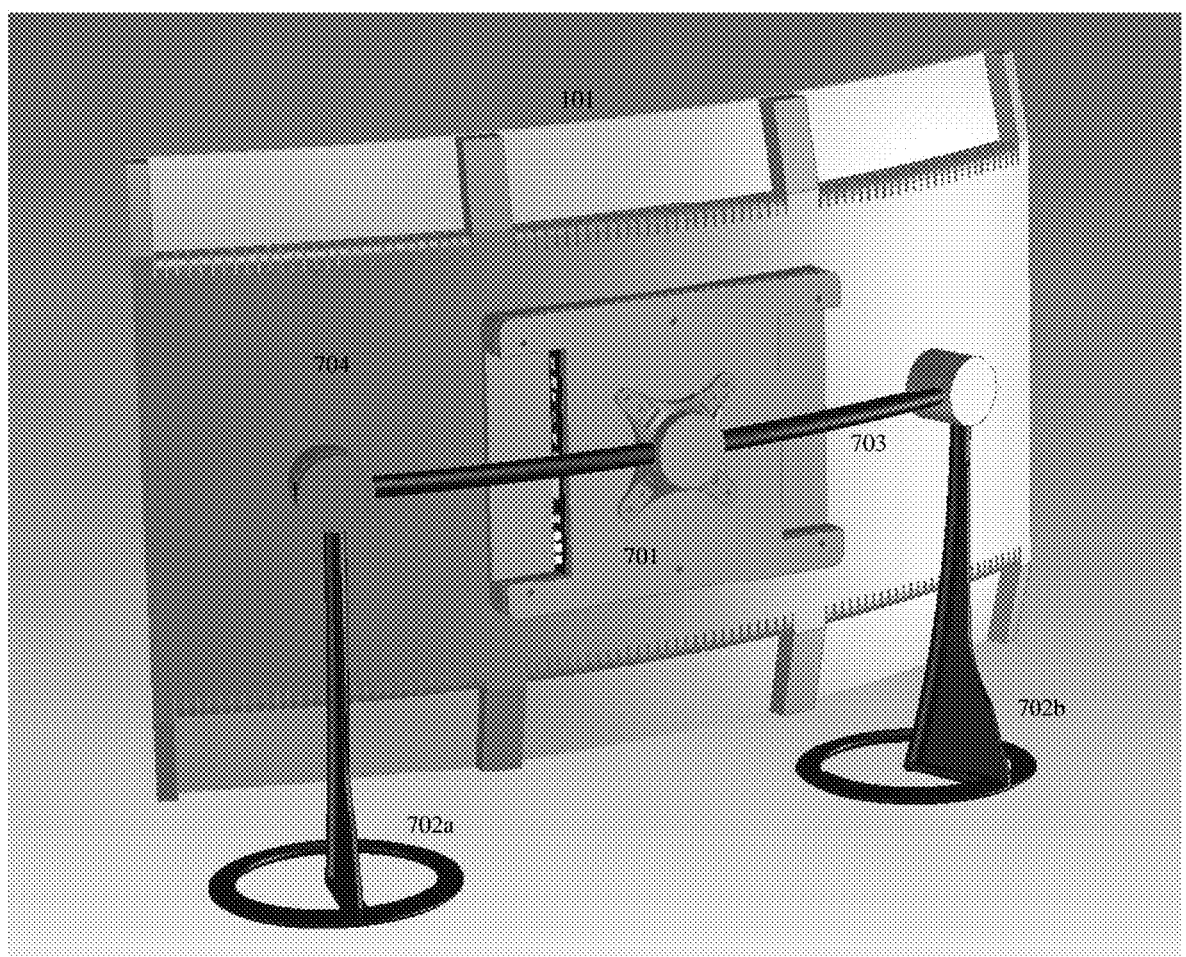
FIG. 7 illustrates a rear view of an immersive desktop digital display, according to an embodiment.

Referring to FIGS. 1 and 7, an embodiment of an immersive digital desktop display 101 is shown. The immersive digital desktop display 101 display surface area may be comprised of one or more of display panels 102. Emissive display panels may be LED, OLED, PLED, PMOLED, AMOLED flexible polyimide-based panel, MicroLED, or any other emissive display technology that can be molded to fit a modular form factor.

In an embodiment, any glass, plastic, silicon, or similar substrate display technology utilizing thin metal layers in a roll-to-roll process for anode and cathode coating may be incorporated into the digital display 101 in a spherical or toric form. The shapes of display modules may be any form factor that adapts to the shape of the digital desktop display 101, for example, trapezoidal LED display modules may be attached to a backplane 108 that is configured as a segment of a sphere or torus. In this example, the LED display modules used to form the immersive digital desktop display 101 are 1.5 mm pixel pitch 102.

The display modules are electrically connected to a display driver controller that maps out each of the display modules in order to activate each display module as needed when reproducing video signals received from a video card or driver in a host computer. The display modules may also be electrically connected to a frame power distribution circuit that is connected to a power supply. Each of the display modules draw power from the frame power distribution circuit.

The backplane 108 is attached to a conformal frame or plate 704. The curvature of the conformal frame or plate 704 and the backplane 108 are based on a calculation of the desired viewing distance. In this example, the (nominal) viewing distance is 150 cm. This means that the radius of curvature is 150 cm. The dimensions of the display are selected to encompass all or part of a user's peripheral vision from the 150 cm viewing distance. This results in the immersive digital desktop display 101, via frame 704, and backplane 108 forming a sector of a sphere (or torus) such that the backplane 108 and frame 704 curve on the Z-axis 104 and X-Y axes 103 from a center 150 cm radius point. In this case, the display is 200 cm wide 105 and 76 cm in height 106. The immersive digital desktop display 101 display surface area may be comprised of a plurality of display modules 102. The display surface area is the interior curvature of a spherical segment or toric segment. A display module, such as a center display module 107, may be 7 cm² which allows the 1.5 mm pixel pitch to effectively show no display module borders at the 150 cm viewing distance. Display modules may be mounted to the backplane 108 that properly positions the display modules 102 so they line the inner curvature of the backplane 108 and emit toward the user.

In an embodiment, the form factor of PMOLEDs, AMOLEDs, and other moldable backplane display technologies work well with the immersive digital desktop display 101. The PMOLED, AMOLED, etc., backplane may be molded into a spherical segment or toric segment which conforms the PMOLED, AMOLED, etc., to the proper curvature. The resulting display panel is mounted to the frame or plate 704. Electrical connections to the display driver and frame power distribution circuit are per the moldable backplane emissive display technology requirements.

In an embodiment, the form factor of flexible formed backplane emissive display technologies (e.g., OLED, etc.) work well with the immersive digital desktop display 101. The formed backplane emissive display sheet/panel may be mounted to the frame 704 which conforms the formed backplane emissive display sheet/panel to the proper curvature. Electrical connections to the display driver and frame power distribution circuit are per the formed emissive display technology requirements.

The backplane 108 that the LED display modules are mounted to or the backplanes of the PMOLED, AMOLED, and other formed display technologies may be formed using a spherical segment calculation or toric segment calculation. These equations are used to form the curvature of the backplane based on the viewing distance and the desired rectangular size of the immersive digital desktop display 101.

Figure 30:
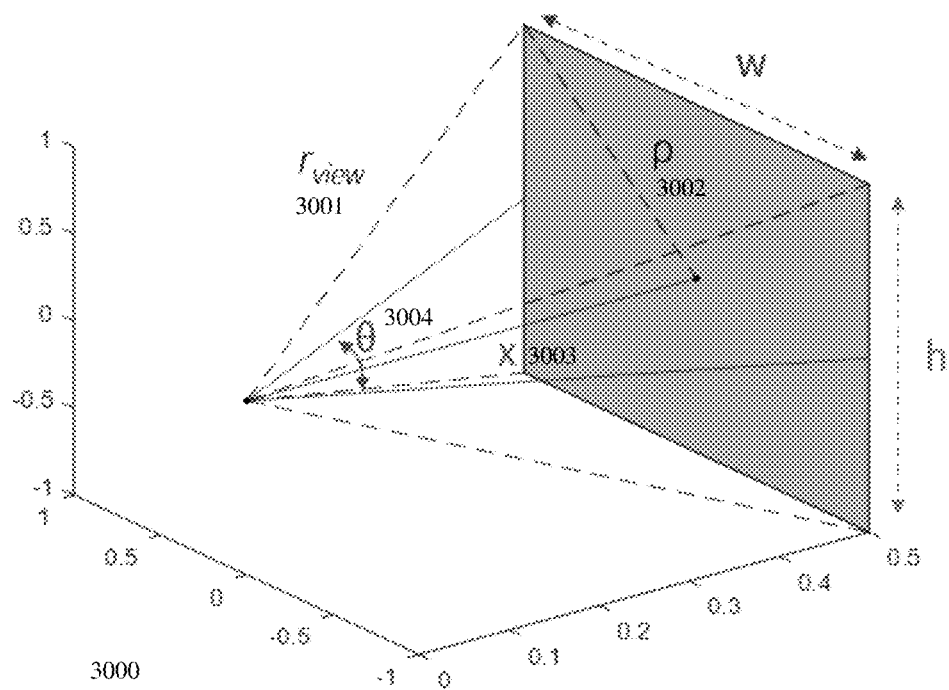
FIG. 30 illustrates an example of a spherical segment calculation, according to an embodiment.

Referring to FIG. 30, an example of a spherical segment calculation is illustrated. The companion calculations are below:

The desired viewing distance is also the radius of the spherical segment R 3001.

$$r_{view} = R$$

P 3002 is the radius of the circle that intercepts the sphere at the position of the flat projection of the display:

$$\rho = \frac{1}{2}\sqrt{w^2 + h^2}$$

x 3003 is the distance between the center of the flat projection of the curved screen and the center of the sphere:

$$x = \sqrt{rview^2 - \rho^2} = \sqrt{rview^2 - \frac{1}{4}(w^2 + h^2)}$$

Θ 3004, the viewing angle is:

$$\sin(\theta) = \frac{w}{2x}$$

Figure 31:
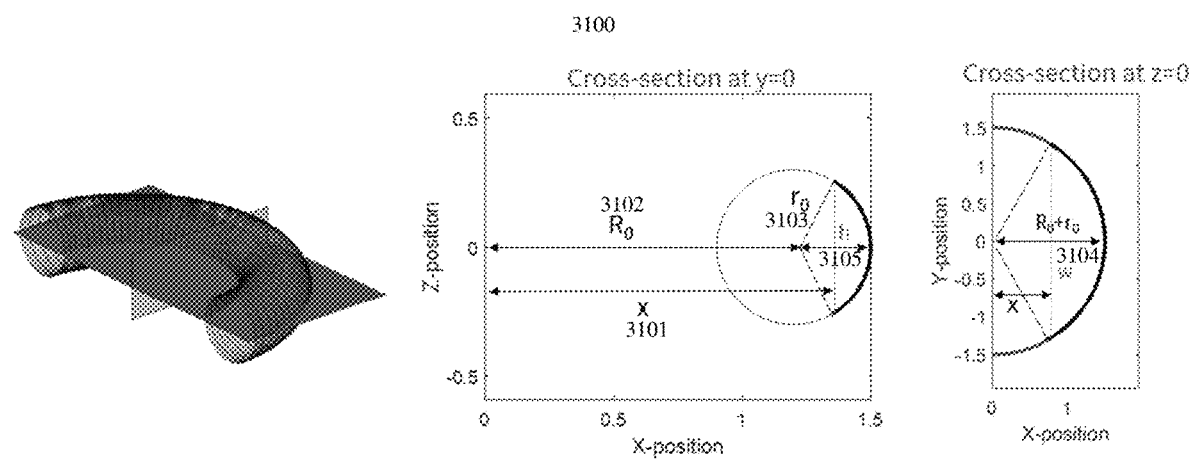
FIG. 31 illustrates an example of a toric segment calculation, according to an embodiment.

Referring to FIG. 31, an example of a toric segment calculation is illustrated. The companion calculations are below:

Let x 3101 be the distance between the center of the flat projection of the curved screen and the center of the torus. Using the two graphs below, we can find the relationships between x 3101 and $r_0$ 3103, $R_0$ 3102, w 3104, and h 3105.

$$(x - R_0)^2 + \left(\frac{h}{2}\right)^2 = r_0^2 \text{ (cross section at } y = 0)$$

$$x^2 + \left(\frac{w}{2}\right)^2 = r_{view}^2 \text{ (cross section at } y = 0)$$

If we combine the two equations above to solve for x:

$$x = \frac{1}{2R_0}\left[\left(R_0^2 - r_0^2 + r_{view}^2\right) + \frac{1}{4}(h^2 - w^2)\right]$$

The display driver may have one or more input connections for video signals from host computers. The inputs may be variants of HDMI, USB Type-C, DisplayPort, mini DisplayPort, DVI, wireless, etc. The display driver interprets the input video signals in order to properly drive the display panels or formed display panels. For instance, a spherically formed AMOLED display incorporates low-temperature polycrystalline silicon (LTPS) within thin film transistors (TFTs) which make up the display backplane which receive video signals.

The frame may alternatively be a wire-frame or skeletal frame where a formed backplane emissive display sheet/panel may be mounted. Since there is a certain amount of rigidity to the formed display, the form factor support may be less than required for mounting rigid backplane display panels, thereby allowing for a lighter weight frame with a more futuristic look. In another embodiment, the wire-frame or skeletal frame is adjustable such that the curvature of the frame may be user-adjusted to different curvatures and field of view (FOV) based on several set user viewing distances. For example, the support mechanism of the wire-frame or skeletal frame may have two or more preset positions that position the frame into different curvature and field of view (FOV) configurations. Each preset position is based on different user viewing distances and field of view (FOV) configurations. This allows the user to set the curvature of the frame to the user's preferred viewing configuration.

Figure 2:
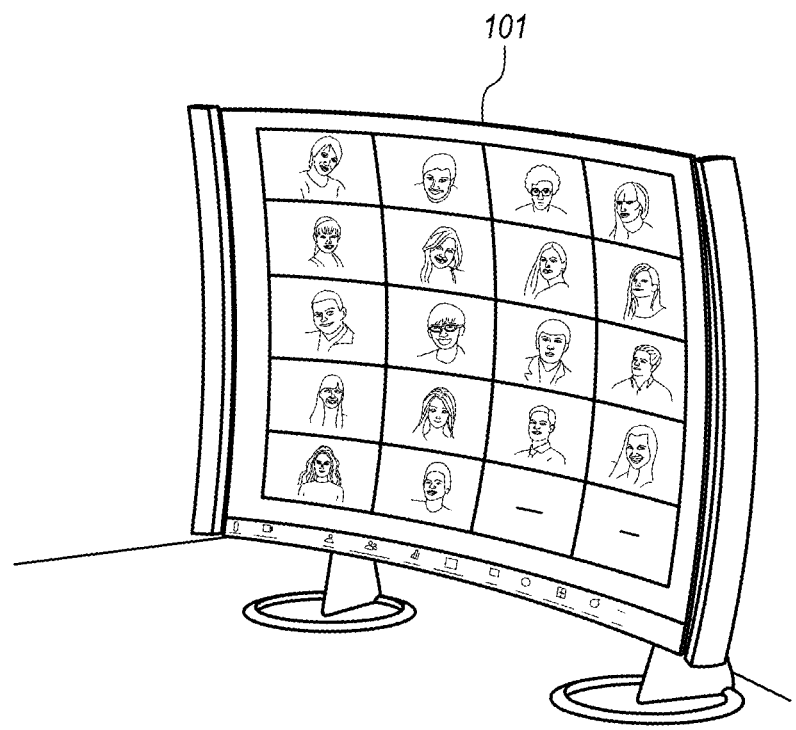
FIG. 2 illustrates an immersive desktop digital display in a video conference call application, according to an embodiment.

Referring to FIG. 2, the immersive digital desktop display 101 may be used for social and professional applications such as video conferencing. The immersive digital desktop display 101 allows the user to see all movement in the displayed video conference participant windows. As the user transitions between windows, there is no need for the user to constantly refocus her vision because all areas of the display surface of the immersive digital desktop display 101 are based on the same or nearly the same viewing distance.

Figure 3:
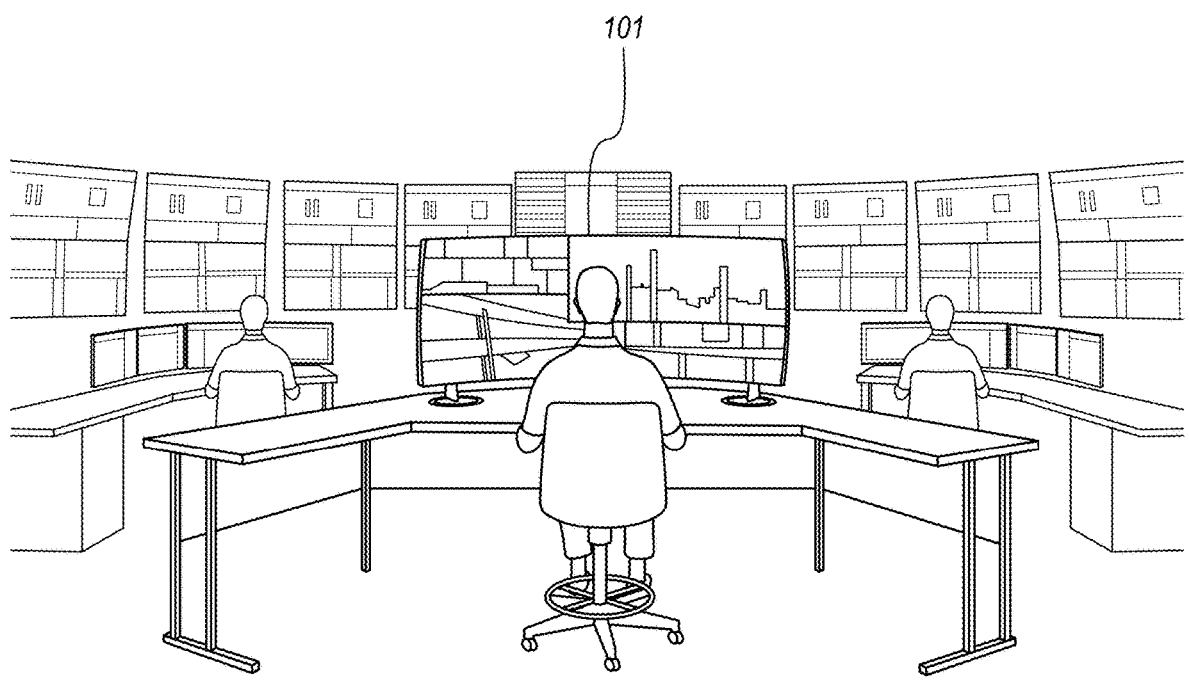
FIG. 3 illustrates an immersive desktop digital display in a high security monitoring application, according to an embodiment.

Referring to FIG. 3, the immersive digital desktop display 101 may be used for professional applications such as commercial system monitoring. An operator may view much more information more efficiently than with other desktop display types. The immersive digital desktop display 101 allows the operator to see all movement in the display. As the operator visually scans across the immersive digital desktop display 101, there is no need for the operator to constantly refocus his vision.

Figure 4:
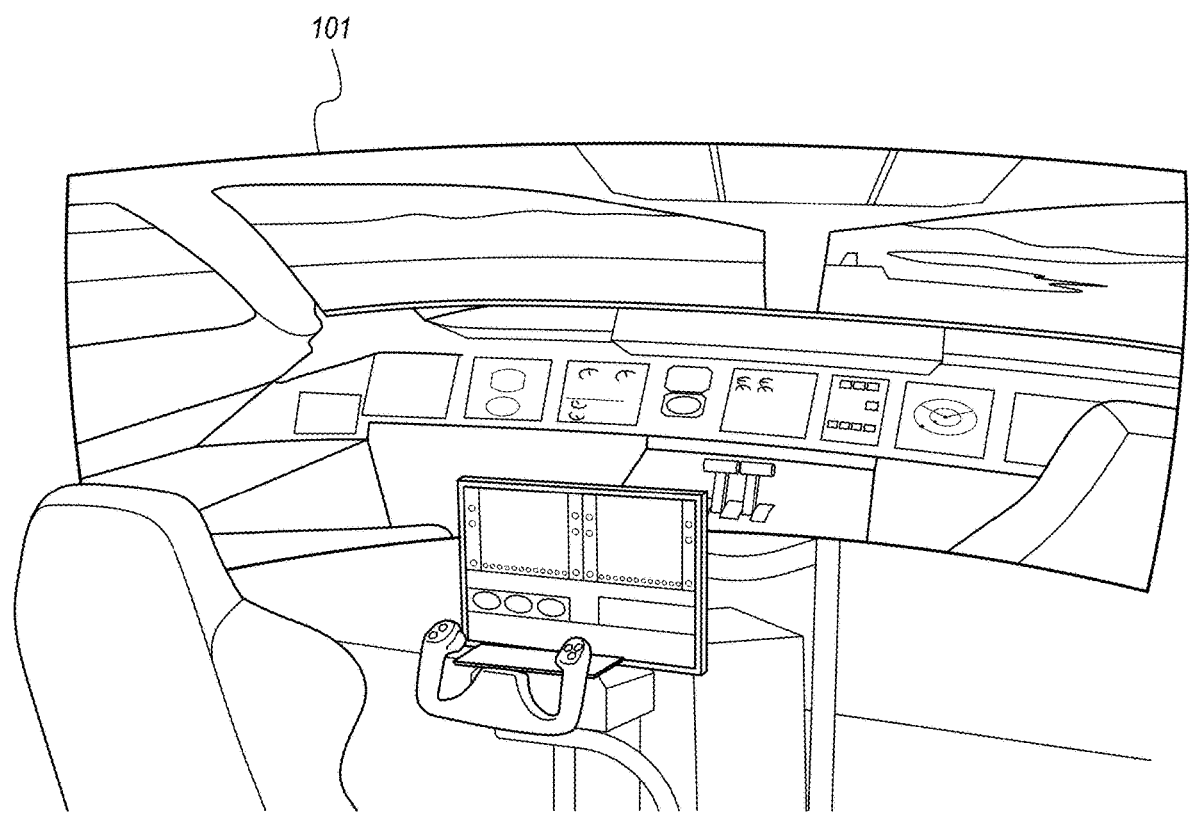
FIG. 4 illustrates an immersive desktop digital display in a aircraft simulation application, according to an embodiment.

Referring to FIG. 4, the immersive digital desktop display 101 may be implemented on a larger scale and used for professional applications such as flight simulation. The immersive digital desktop display 101 provides the user with a more realistic experience than with conventional displays. As the user scans the horizon, there is no need for the user to constantly refocus his vision because all areas of the display surface of the immersive digital desktop display 101 are based on the near the same viewing distance.

Figure 5:
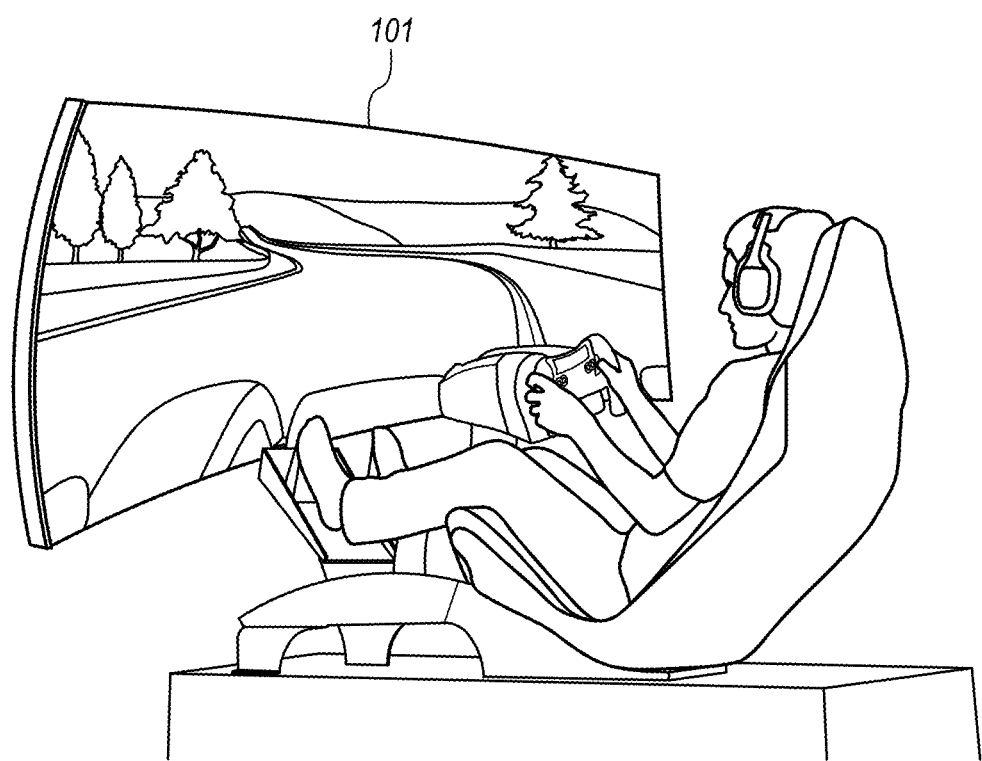
FIG. 5 illustrates an immersive desktop digital display in a automotive simulation application, according to an embodiment.

Referring to FIG. 5, the immersive digital desktop display 101 may be used for gaming applications such as e-gaming. The immersive digital desktop display 101 provides the user with a more realistic experience than with conventional displays. The user can easily use his peripheral vision unlike other conventional display where the user must refocus his vision in order to see details outside of his central viewpoint.

Figure 6:
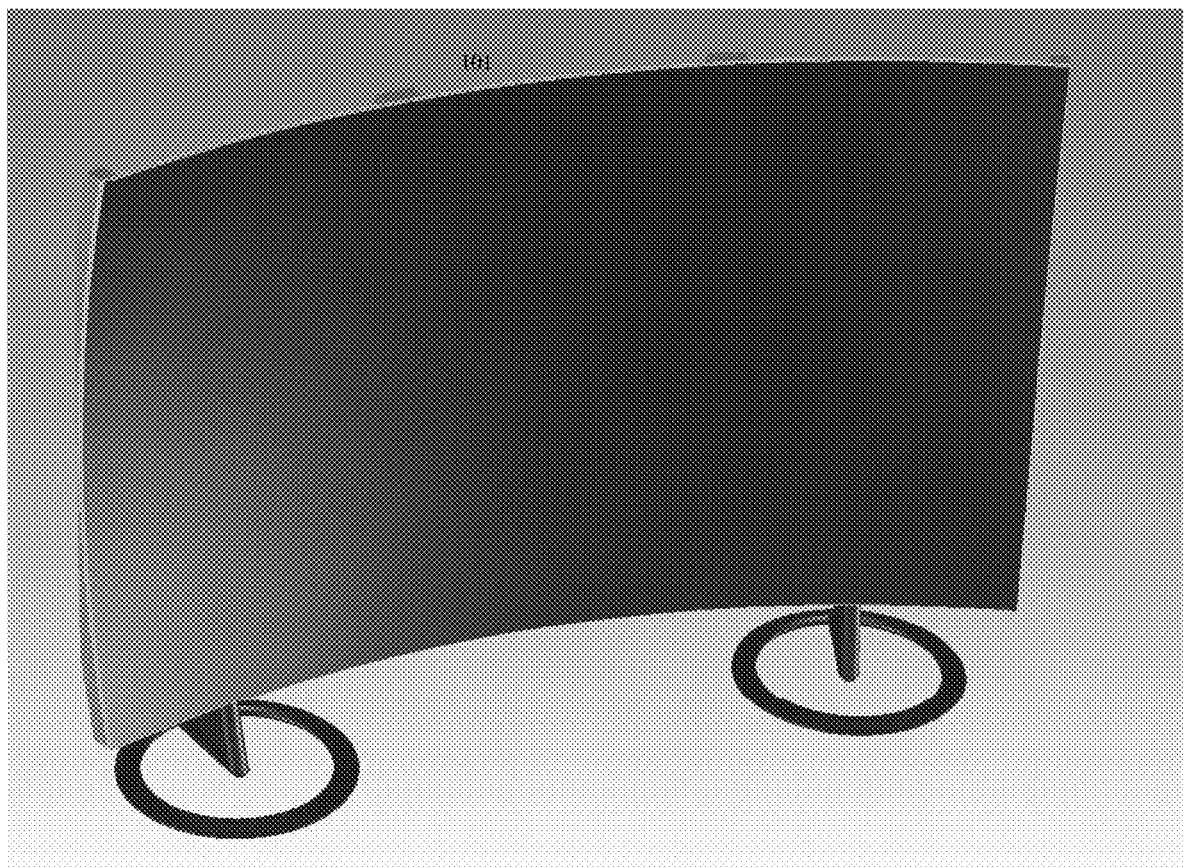
FIG. 6 illustrates a front view of an immersive desktop digital display, according to an embodiment.

Referring to FIG. 6, in an embodiment, the immersive digital desktop display 101 may be sized as a central unit that is expected to be more commonly used for the typical consumer. Referring to FIG. 7, the immersive digital desktop display 101 may be supported by a frame 704 having a central mount 701 that allows the immersive digital desktop display 101 to be mounted using a VESA mount or by a stand mount that includes a lateral support 703 that spreads the weight distribution across the two stand mounts 702a and 702b.

Figure 8:
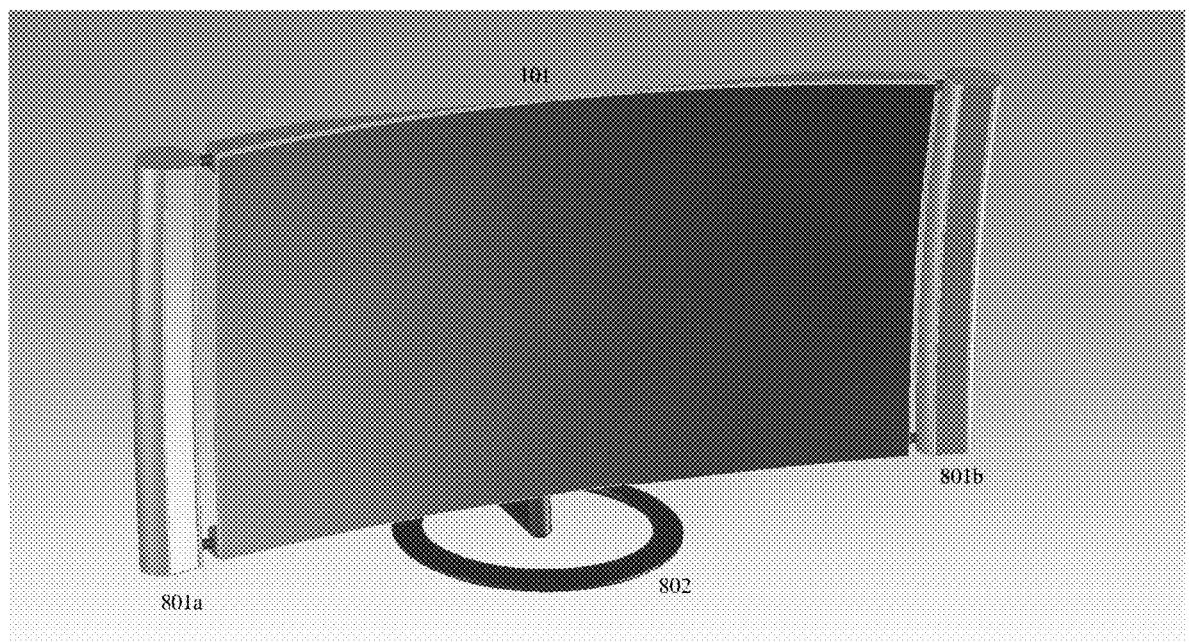
FIG. 8 illustrates a front view of an immersive desktop digital display with stereo speakers, according to an embodiment.

Referring to FIG. 8, in an embodiment, the immersive digital desktop display 101 may be mounted on a single stand 802. Stereo speakers 801a and 801b may be mounted to the sides of a frame of the immersive digital desktop display 101.

Figure 9:
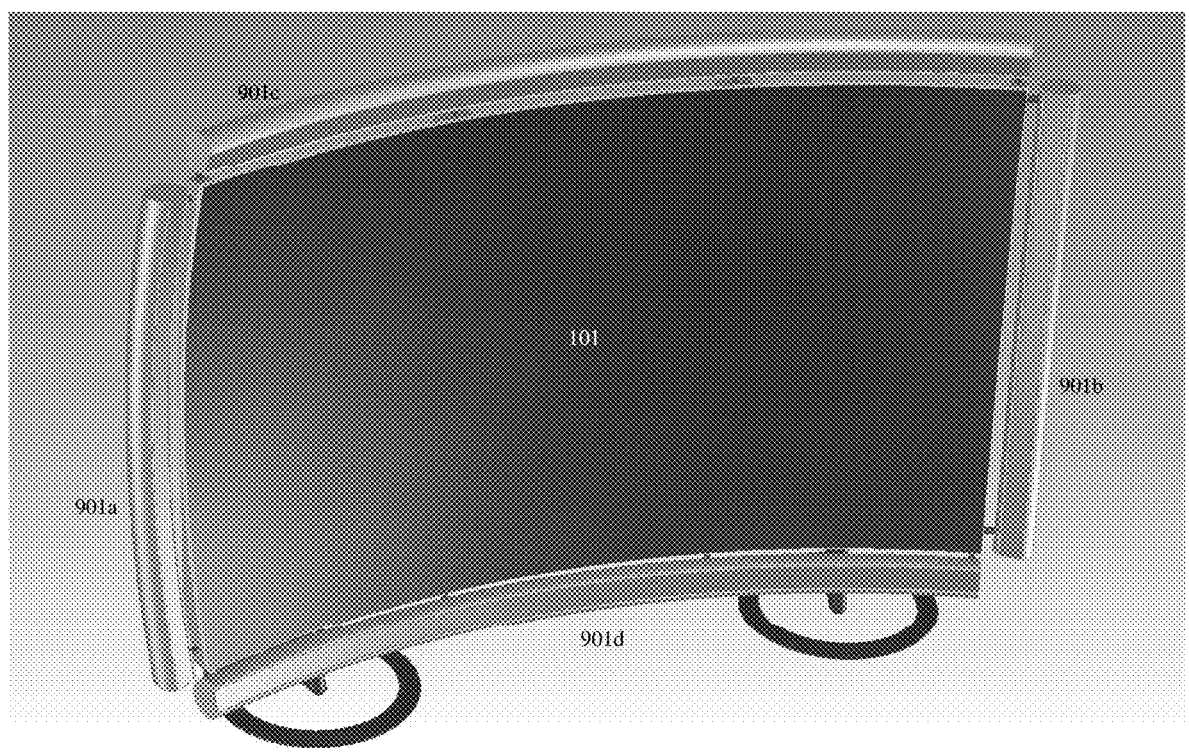
FIG. 9 illustrates a front view of an immersive desktop digital display with surround speakers, according to an embodiment.

Referring to FIG. 9, in an embodiment, surround sound speakers 901a-d are mounted to a frame on the immersive digital desktop display 101.

Figure 10:
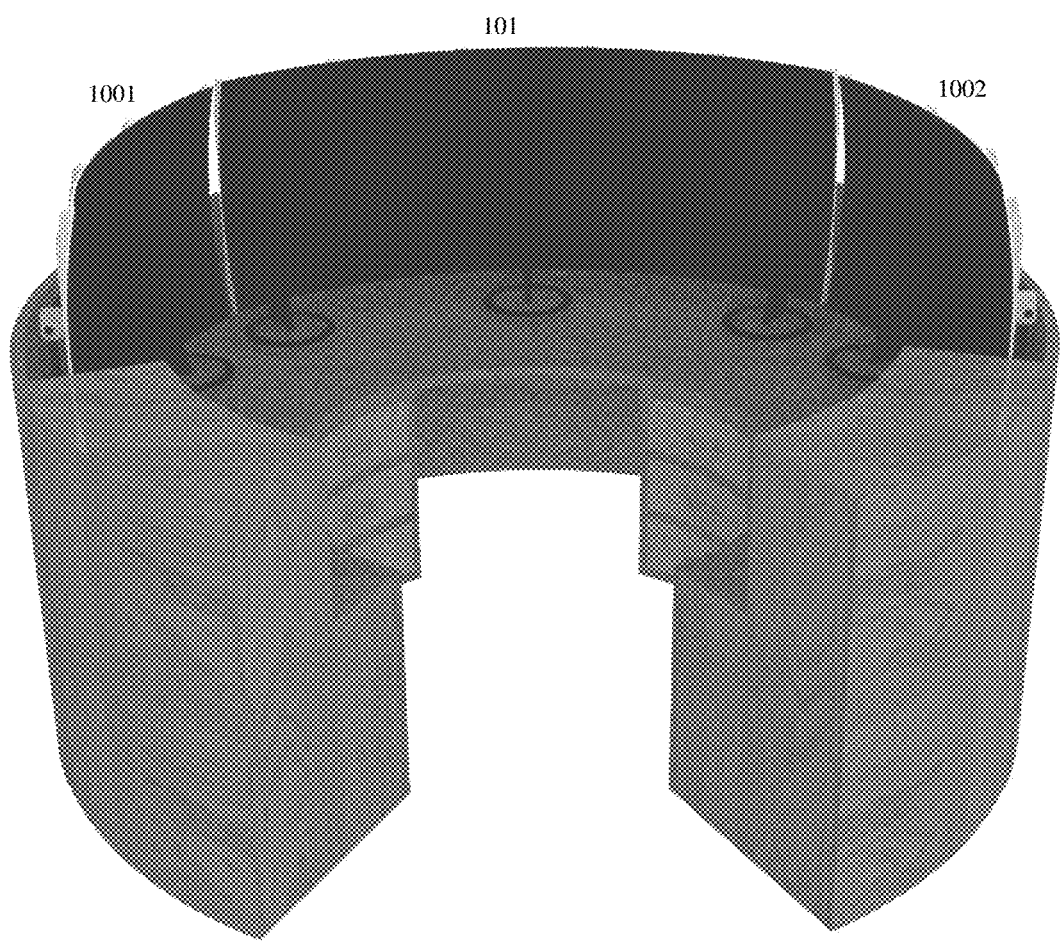
FIG. 10 illustrates a surround immersive desktop digital display, according to an embodiment.

Referring to FIG. 10, in an embodiment, additional immersive digital desktop displays 1001, 1002, may easily be added to the immersive digital desktop display 101. Since the spherical segment or toric segment curvature of the additional immersive digital desktop displays 1001, 1002, is based on a common radius, the additional immersive digital desktop displays 1001, 1002, remain in the same focal range (by continuing the three-dimensional curvature of the immersive digital desktop display 101) as the immersive digital desktop display 101. Thus, an implementation of a 270-degree immersive desktop environment is easily implemented.

Figure 11:
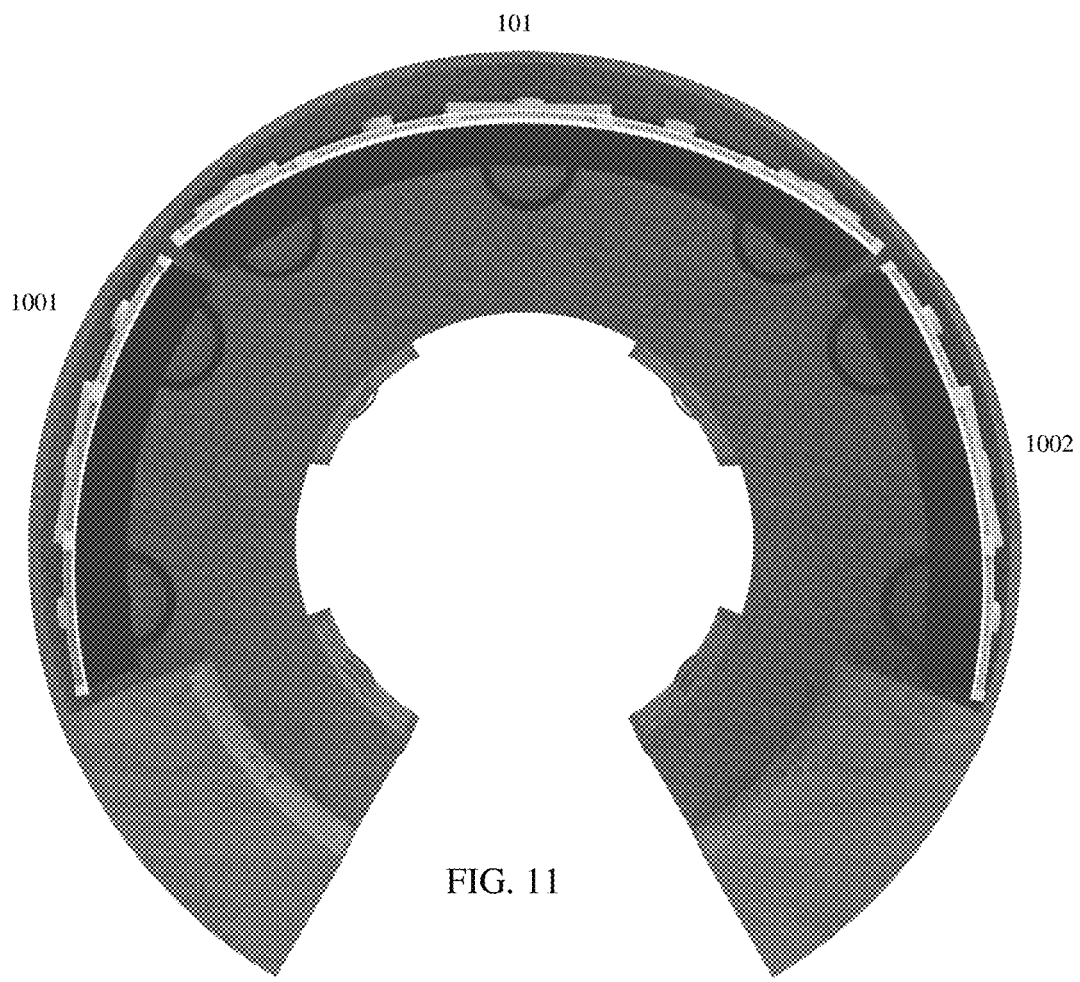
FIG. 11 illustrates a top view of a surround immersive desktop digital display, according to an embodiment.

FIG. 11, illustrates a top view of the immersive digital desktop display 101 and the additional immersive digital desktop displays 1001, 1002.

Figure 12:
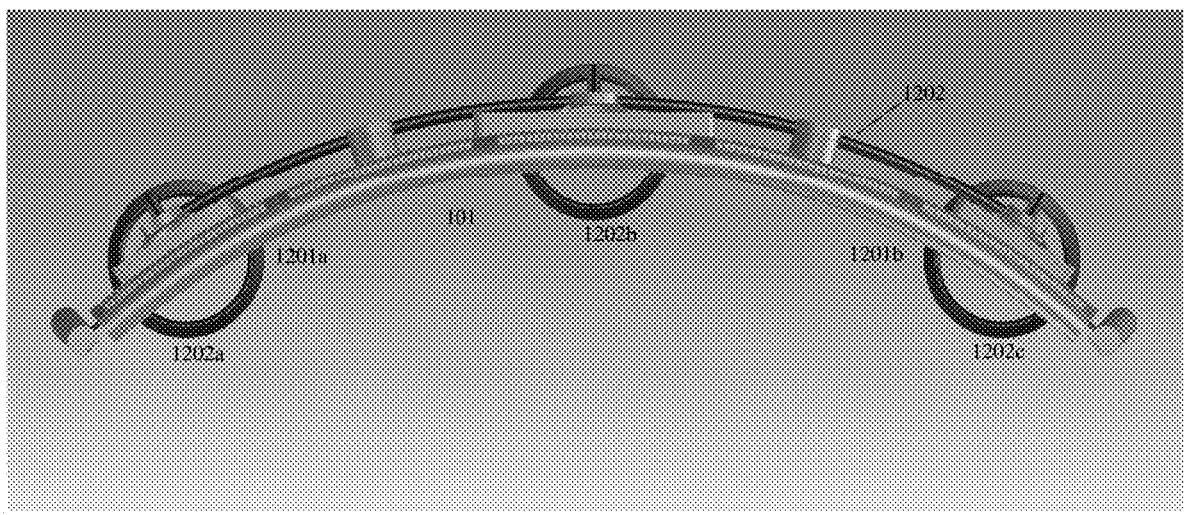
FIG. 12 illustrates a top view of a multi-module immersive desktop digital display, according to an embodiment.

Referring to FIG. 12, in an embodiment, smaller additional immersive digital desktop displays 1201a, 1201b, may be added to the immersive digital desktop display 101. This configuration allows the immersive digital desktop display 101 and the smaller additional immersive digital desktop displays 1201a, 1201b, to fit on a typical user desktop. The load distribution bar 1202 spreads the weight across three stands 1202a-c and mounts the smaller additional immersive digital desktop displays 1201a, 1201b in a juxtaposition configuration.

Figure 13:
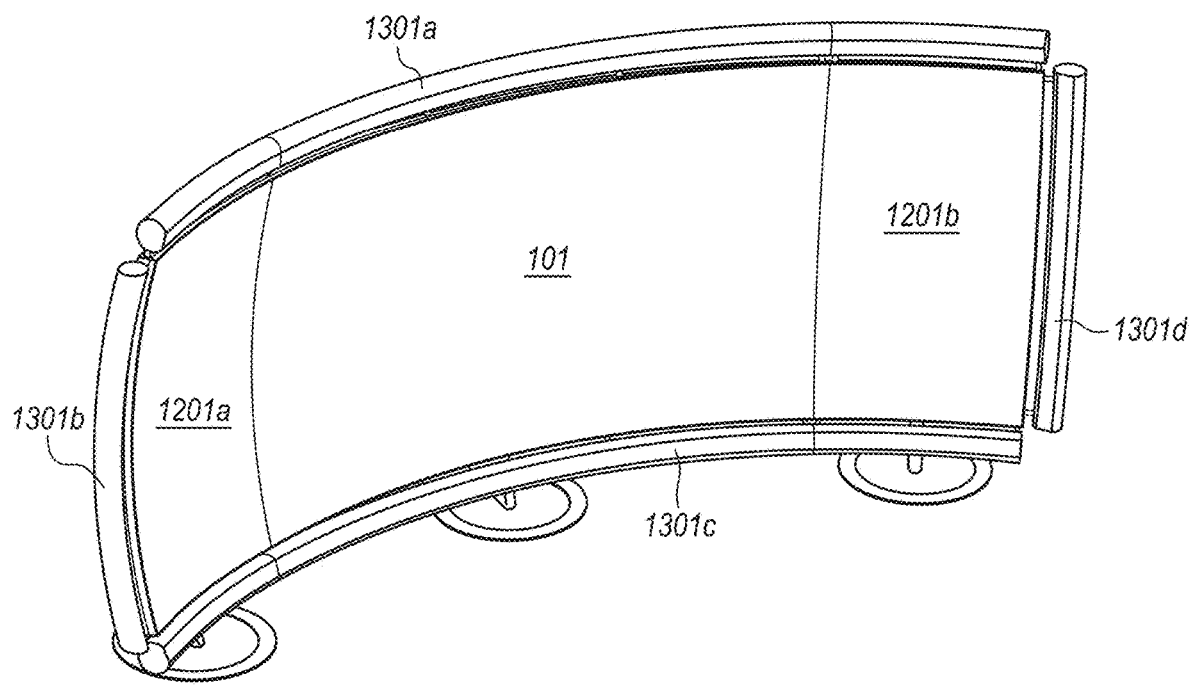
FIG. 13 illustrates a front perspective view of a multi-module immersive desktop digital display, according to an embodiment.

FIG. 13, illustrates a front perspective view of the immersive digital desktop display 101 and the smaller additional immersive digital desktop displays 1201a, 1201b. Surround sound speakers 1301a-d are mounted around the juxtaposition frame of the immersive digital desktop display 101 and the smaller additional immersive digital desktop displays 1201a, 1201b.

Figure 14:
FIG. 14 illustrates a front view of a multi-module immersive desktop digital display, according to an embodiment.

FIG. 14, illustrates a front view of the immersive digital desktop display 101 and the smaller additional immersive digital desktop displays 1201a, 1201b.

Figure 15:
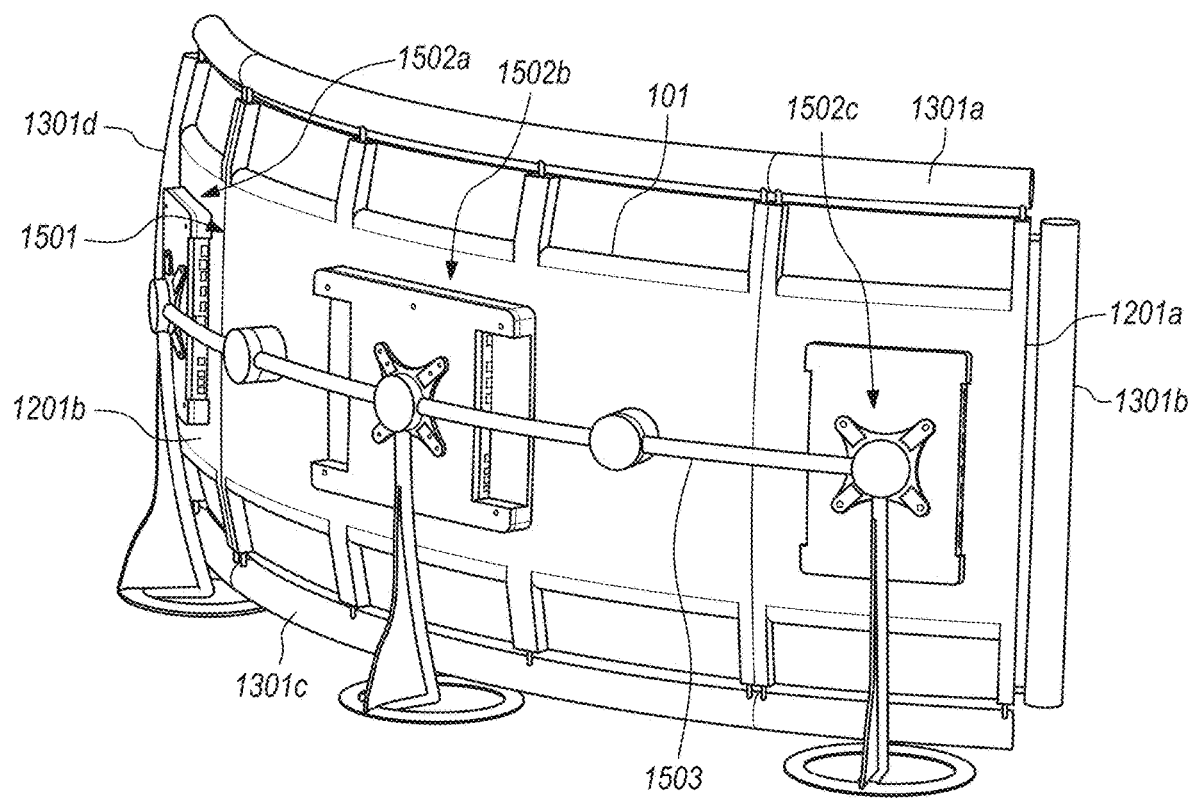
FIG. 15 illustrates a rear perspective view of a multi-module immersive desktop digital display, according to an embodiment.

FIG. 15, illustrates a rear perspective view of the immersive digital desktop display 101 and the smaller additional immersive digital desktop displays 1201a, 1201b. Surround sound speakers 1301a-d are mounted around the juxtaposition frame of the immersive digital desktop display 101 and the smaller additional immersive digital desktop displays 1201a, 1201b. The modular three-display juxtaposition mounting system 1501 is shown where the frames of the smaller additional immersive digital desktop displays 1201a, 1201b, are mounted in juxtaposition to the frame of the immersive digital desktop display 101. The mounting pads 1502a-c for each of the display assemblies 101, 1201a, 1201b, attach to the central support 1503 which holds the three display assemblies in place.

Figure 16:
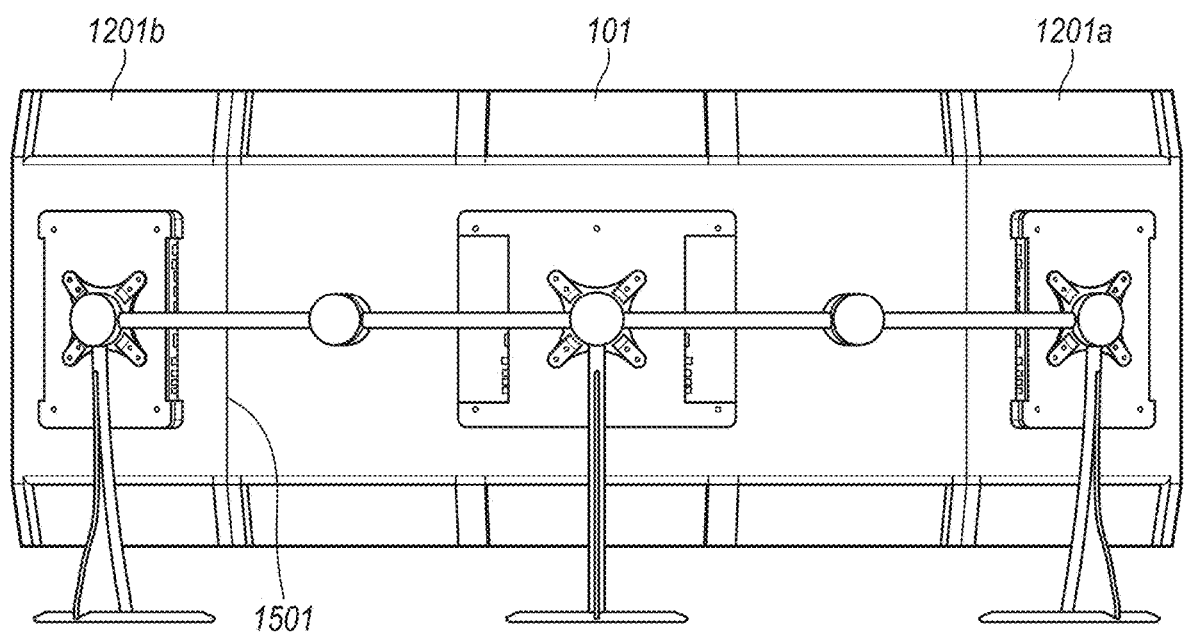
FIG. 16 illustrates a rear view of a multi-module immersive desktop digital display, according to an embodiment.

FIG. 16, illustrates a rear view of the immersive digital desktop display 101 and the smaller additional immersive digital desktop displays 1201a, 1201b. The modular three-display juxtaposition mounting system 1501 is shown where the smaller additional immersive digital desktop displays 1201a, 1201b, are mounted in juxtaposition to the immersive digital desktop display 101.

Figure 17:
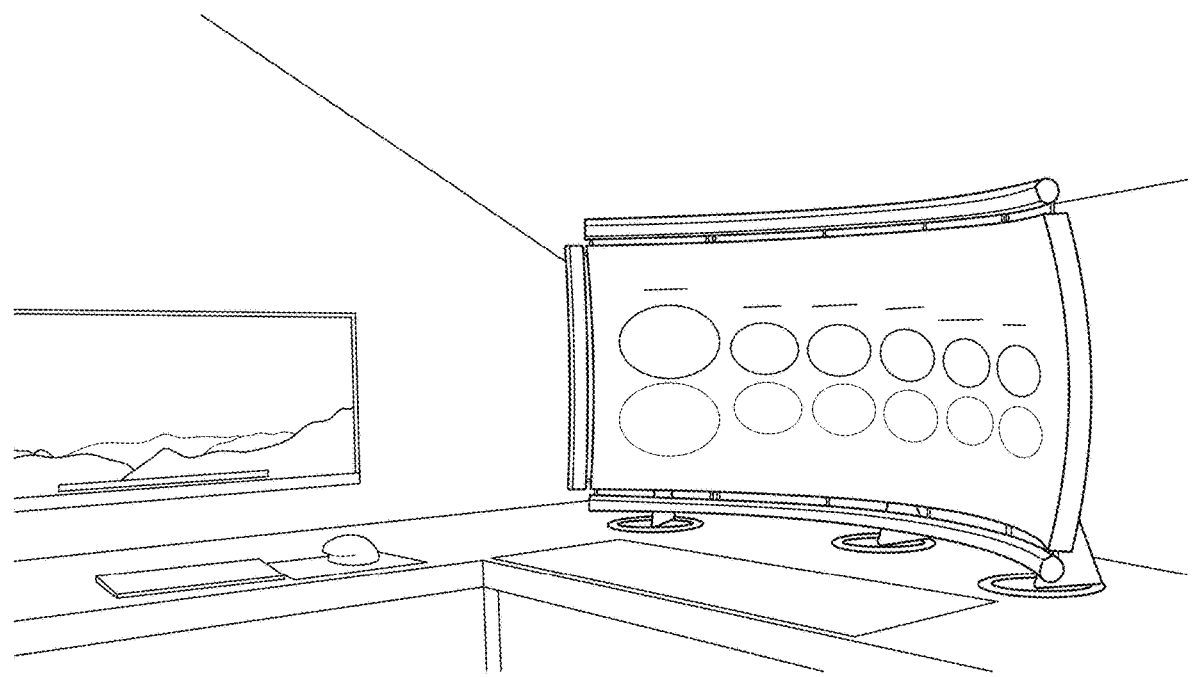
FIG. 17 illustrates a multi-module immersive desktop digital display in a home environment, according to an embodiment.

FIG. 17 illustrates the immersive digital desktop display and the smaller additional immersive digital desktop displays in a typical home office use.

Figure 18:
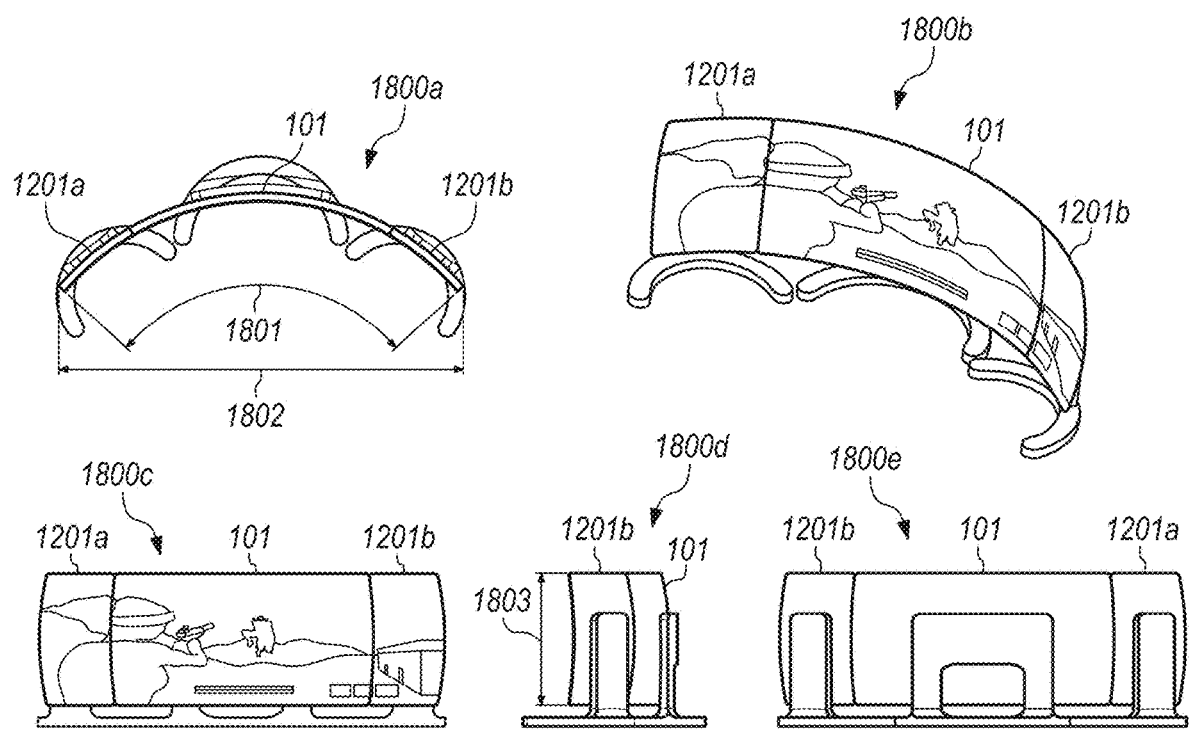
FIG. 18 illustrates 3D views of a multi-module immersive desktop digital display, according to an embodiment.

FIG. 18 illustrates several views of the immersive digital desktop display 101 and the smaller additional immersive digital desktop displays 1201a, 1201b. A top view 1800a shows that a 100-degree viewing angle 1801 can be with a viewing distance of 150 cm resulting in a width of 231 cm 1802 for the combined display modules. 1800b is a front perspective view showing the immersive digital desktop display 101 and the smaller additional immersive digital desktop displays 1201a, 1201b. 1800c is a front view of the immersive digital desktop display 101 and the smaller additional immersive digital desktop displays 1201a, 1201b. 1800d is a side view of the immersive digital desktop display 101 and the smaller additional immersive digital desktop displays 1201a, 1201b, showing the height of the modules is 76 cm. 1800e is a rear view of the immersive digital desktop display 101 and the smaller additional immersive digital desktop displays 1201a, 1201b.

Figure 19:
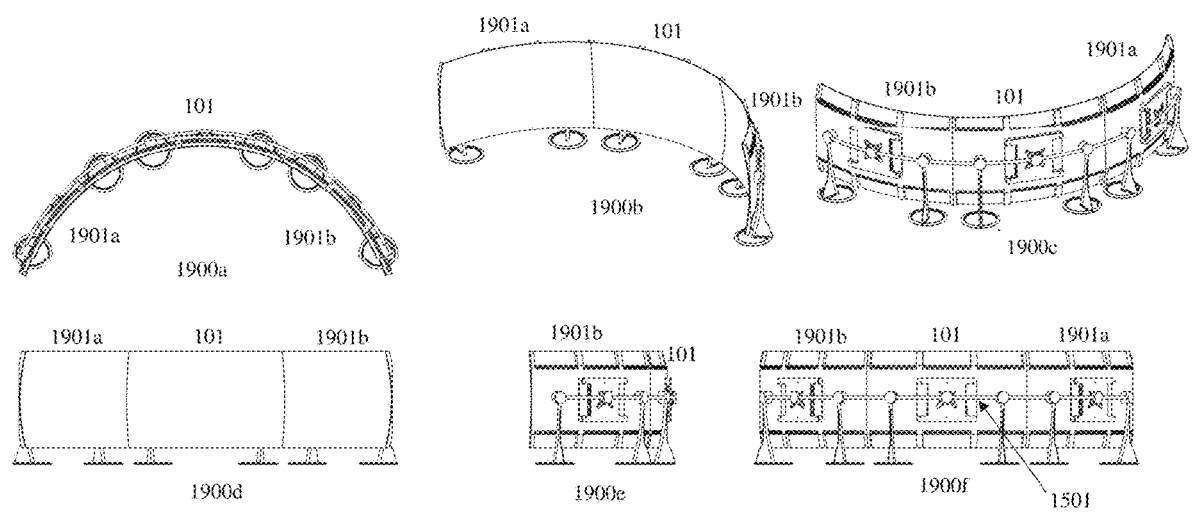
FIG. 19 illustrates 3D views of a multi-module immersive desktop digital display, according to an embodiment.

FIG. 19 illustrates several views of the immersive digital desktop display 101 and additional immersive digital desktop displays 1901a, 1901b, that are the same or similar size to the immersive digital desktop display 101. The additional immersive digital desktop displays 1901a, 1901b, are mounted in a juxtaposition mounting system as discussed above. 1900a is top view of the immersive digital desktop display 101 and the additional immersive digital desktop displays 1901a, 1901b. 1900b is a front perspective view showing the immersive digital desktop display 101 and the additional immersive digital desktop displays 1901a, 1901b. 1900c is a rear perspective view of the immersive digital desktop display 101 and the additional immersive digital desktop displays 1901a, 1901b. 1900d is a front view of the immersive digital desktop display 101 and the additional immersive digital desktop displays 1901a, 1901b. 1900e is a side view of the immersive digital desktop display 101 and the additional immersive digital desktop displays 1901a, 1901b. 1900d is a rear view of the immersive digital desktop display 101 and the additional immersive digital desktop displays 1901a, 1901b, along with the juxtaposition mounting system 1501.

Figure 20:
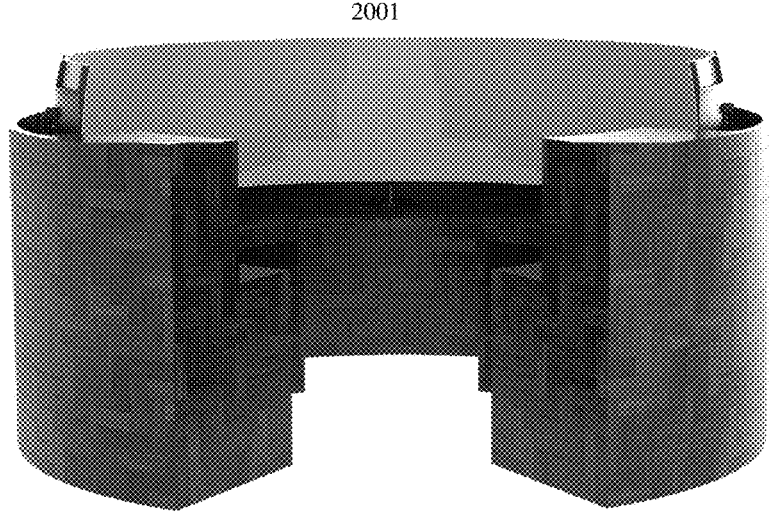
FIG. 20 illustrates a front view of a surround immersive desktop digital display, according to an embodiment.

Referring to FIG. 20, in an embodiment, one or more immersive digital desktop displays may be used to create a, 270-degree field of view (as well as a 360 degree field of view), immersive surround desktop environment 2001. When more than one immersive digital desktop display is used, a version of the juxtaposition mounting system 1501 is used that is adapted to the number of display modules being used.

Figure 21:
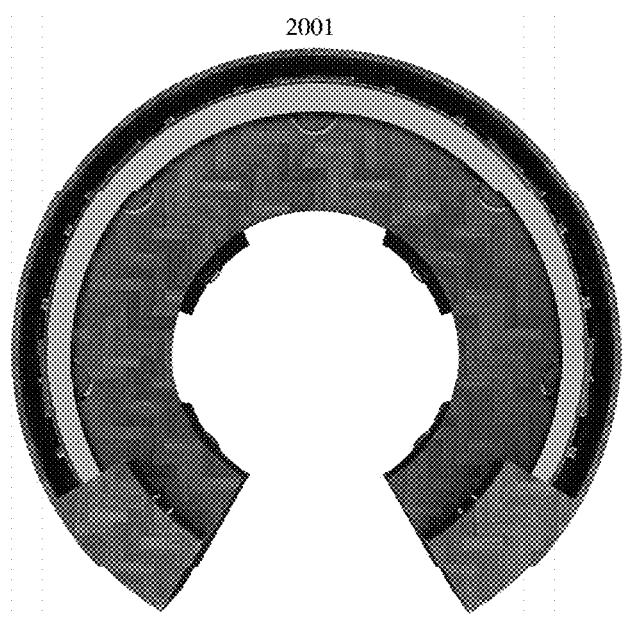
FIG. 21 illustrates a front view of a surround immersive desktop digital display, according to an embodiment.

FIG. 21 illustrates a top view of the immersive surround desktop environment 2001.

Figure 22:
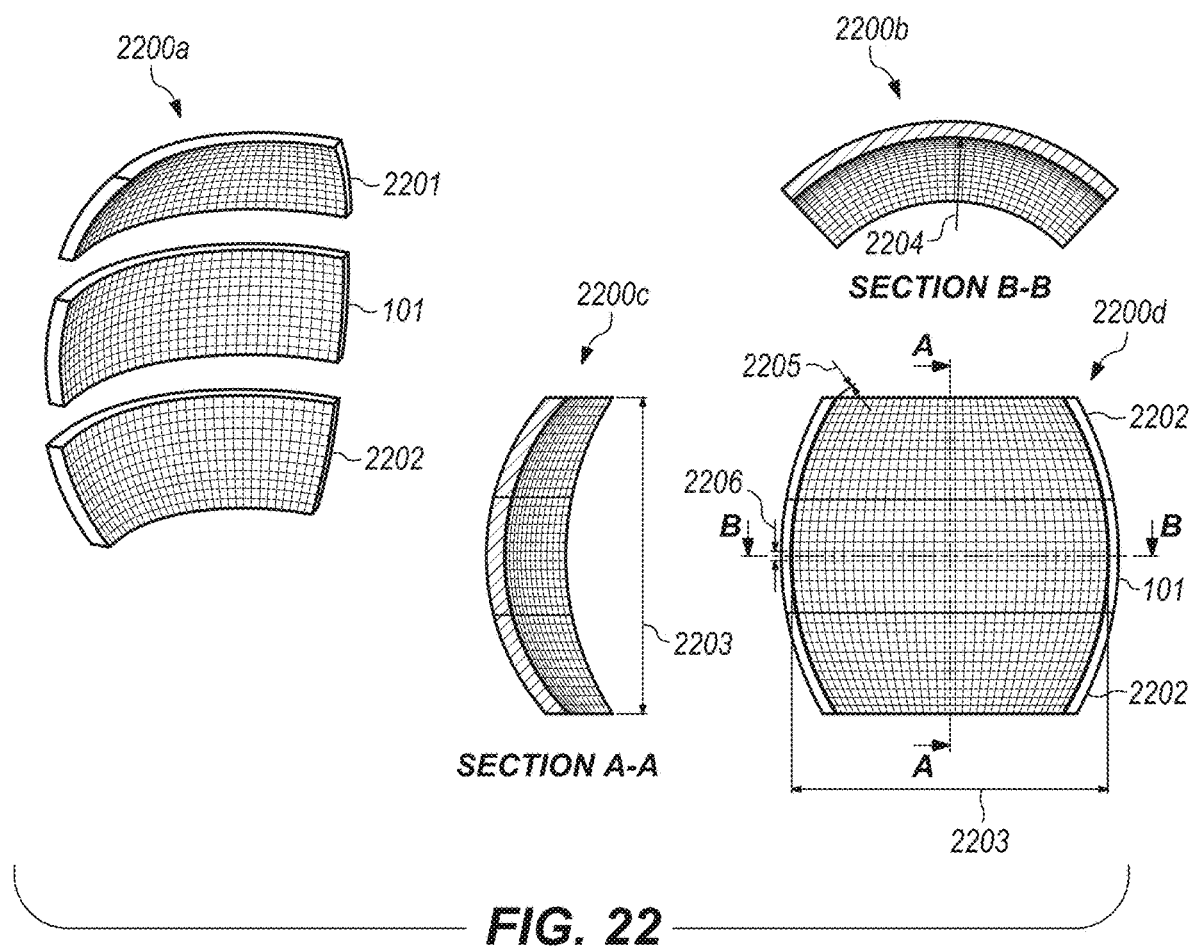
FIG. 22 illustrates 3D perspective views of a vertically inclusive immersive digital environment, according to an embodiment.

Referring to FIG. 22, in an embodiment, a vertically inclusive immersive digital environment 2200a may be created using the spherical segments or toric segments as discussed above. A center display module 101 along with an upper display module 2201, and a lower display module 2202 form a display system that provides users with a vertical immersive environment as well as a horizontal immersive environment. The upper display module 2201 may have a conformal backplane that has a curvature based on the viewing distance, the height of the upper display module above the user line of sight, and the desired rectangular size. The lower display module 2202 may have a conformal backplane that has a curvature based on the viewing distance, the height of the upper display module above or below the user line of sight, and the desired rectangular size. Many applications benefit from the user being able to scan above and below the virtual horizon. 2200b is a top view showing a viewing distance of 150 cm 2204. 2200c is another top view showing the display assembly width as 200 cm 2203. 2200d is a front view showing the center display module 101 along with the upper display module 2202, and the lower display module 2203. The display panel may be 7 cm$^2$ 2206 and 0.060 cm thick 2205.

Figure 23:
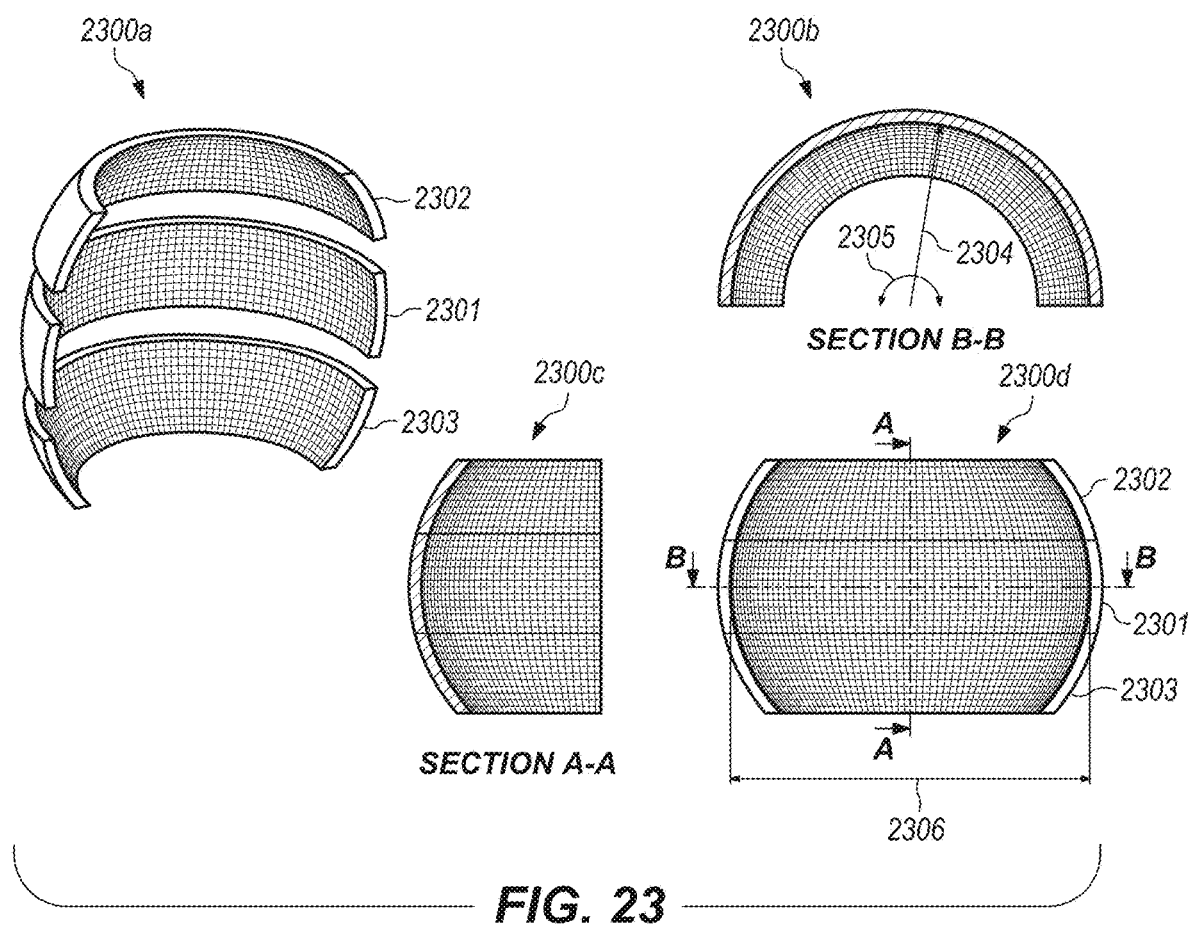
FIG. 23 illustrates 3D perspective views of a vertically and horizontally inclusive immersive digital environment, according to an embodiment.

Referring to FIG. 23, in an embodiment, a vertically and horizontally inclusive immersive digital environment 2300a may be created using the spherical segments or toric segments as discussed above. A center display assembly 2301 along with an upper display assembly 2302, and a lower display assembly 2303 form a display system that provides users with a 180 degree or more immersive environment. Each module may be comprised of one or more display assemblies that may differ in size based on application. 2300b and 2300c are top views showing a viewing distance of 150 cm 2304 and a 180-degree viewing area 2305. In other embodiments, the viewing area may be more or less than 180 degrees. 2300d is front view showing the display assembly width as 300 cm 2306.

Figure 24:
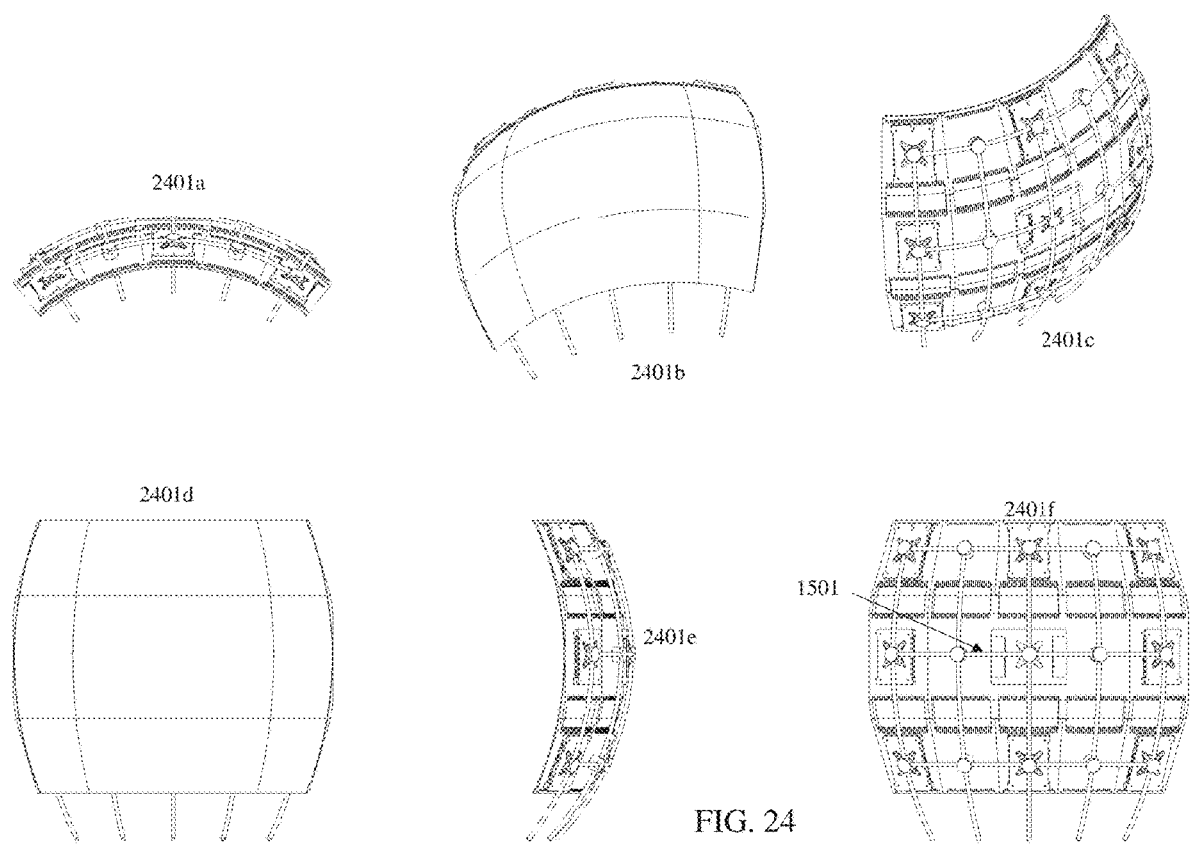
FIG. 24 illustrates several views of the vertically and horizontally inclusive immersive digital environment, according to an embodiment.

FIG. 24 illustrates several views of the vertically and horizontally inclusive immersive digital environment. 2401a is top view of the vertically and horizontally inclusive immersive digital environment. 2401b is a front perspective view showing the vertically and horizontally inclusive immersive digital environment. 2401c is a rear perspective view of the vertically and horizontally inclusive immersive digital environment. 2401d is a front view of the vertically and horizontally inclusive immersive digital environment. 2401e is a side view of the vertically and horizontally inclusive immersive digital environment. 2401f is a rear view of the vertically and horizontally inclusive immersive digital environment, along with the juxtaposition mounting system 1501.

Figure 25:
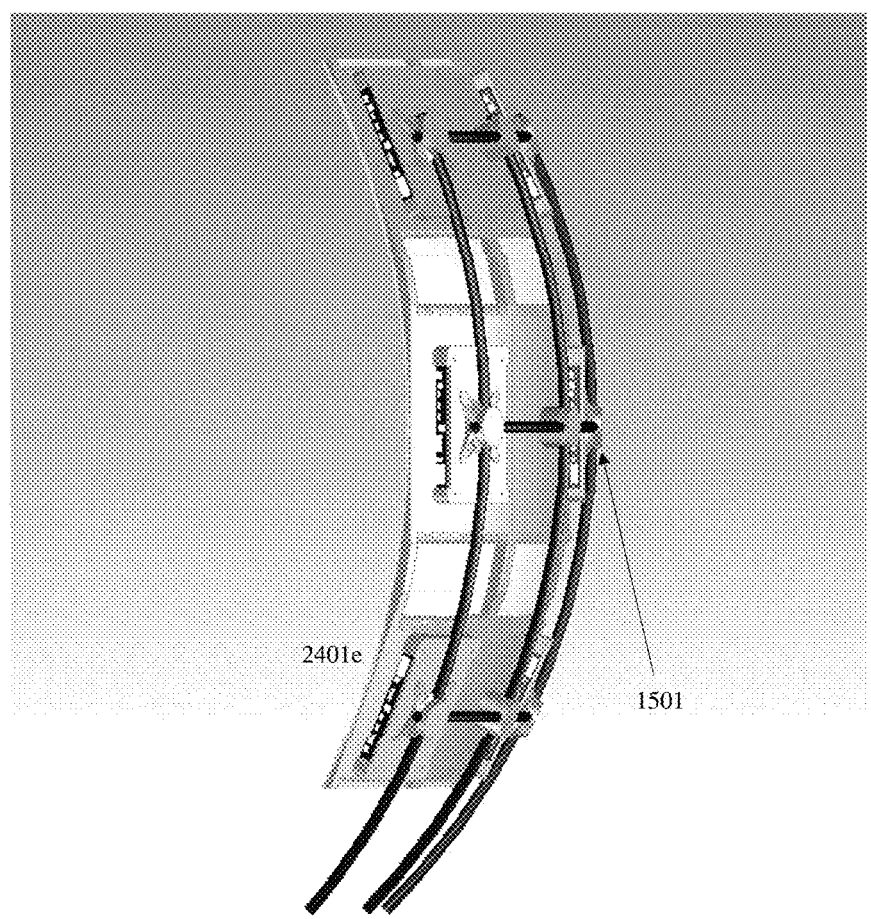
FIG. 25 illustrates a side view of the vertically and horizontally inclusive immersive digital environment along with the juxtaposition mounting system, according to an embodiment.

FIG. 25 illustrates an enlarged view of 2401e which is a side view of the vertically and horizontally inclusive immersive digital environment along with the juxtaposition mounting system 1501.

Figure 26:
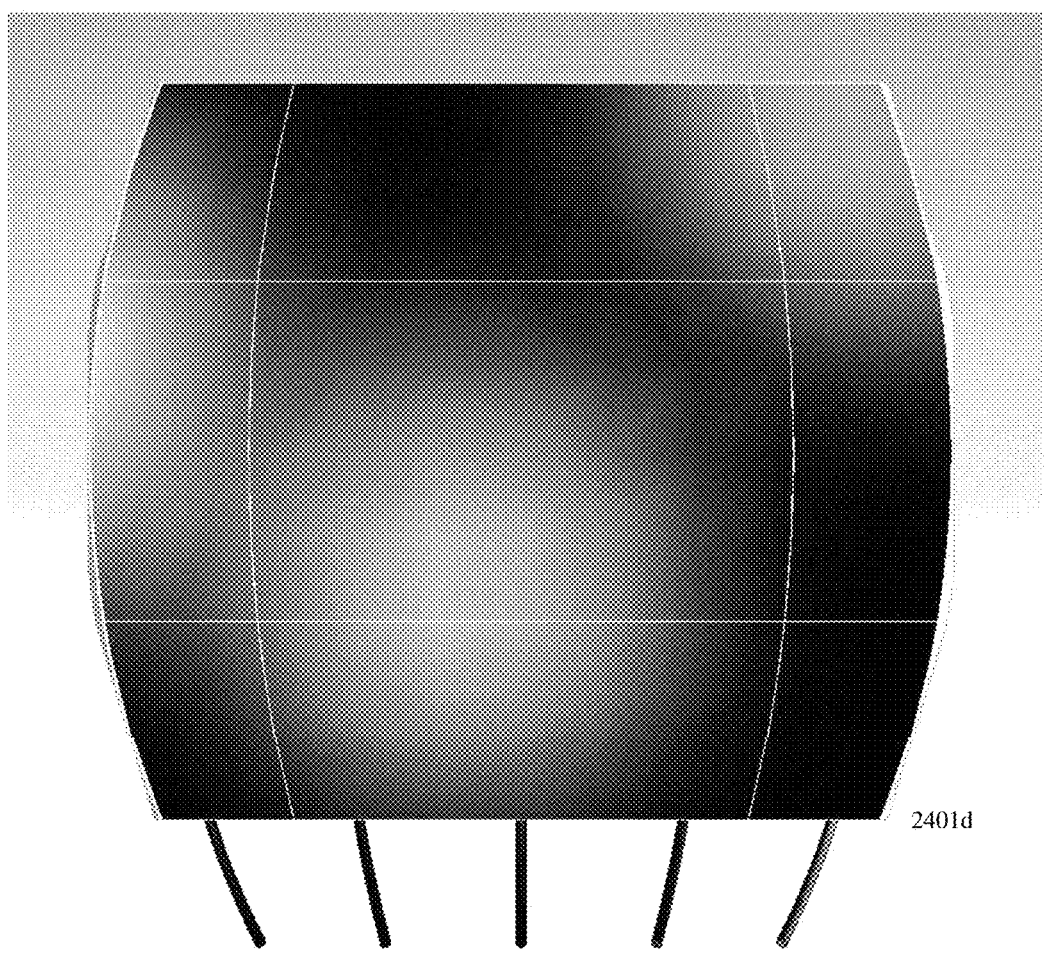
FIG. 26 illustrates a front view of the vertically and horizontally inclusive immersive digital environment, according to an embodiment.

FIG. 26 illustrates an enlarged view of 2401d which is a front view of the vertically and horizontally inclusive immersive digital environment.

Figure 27:
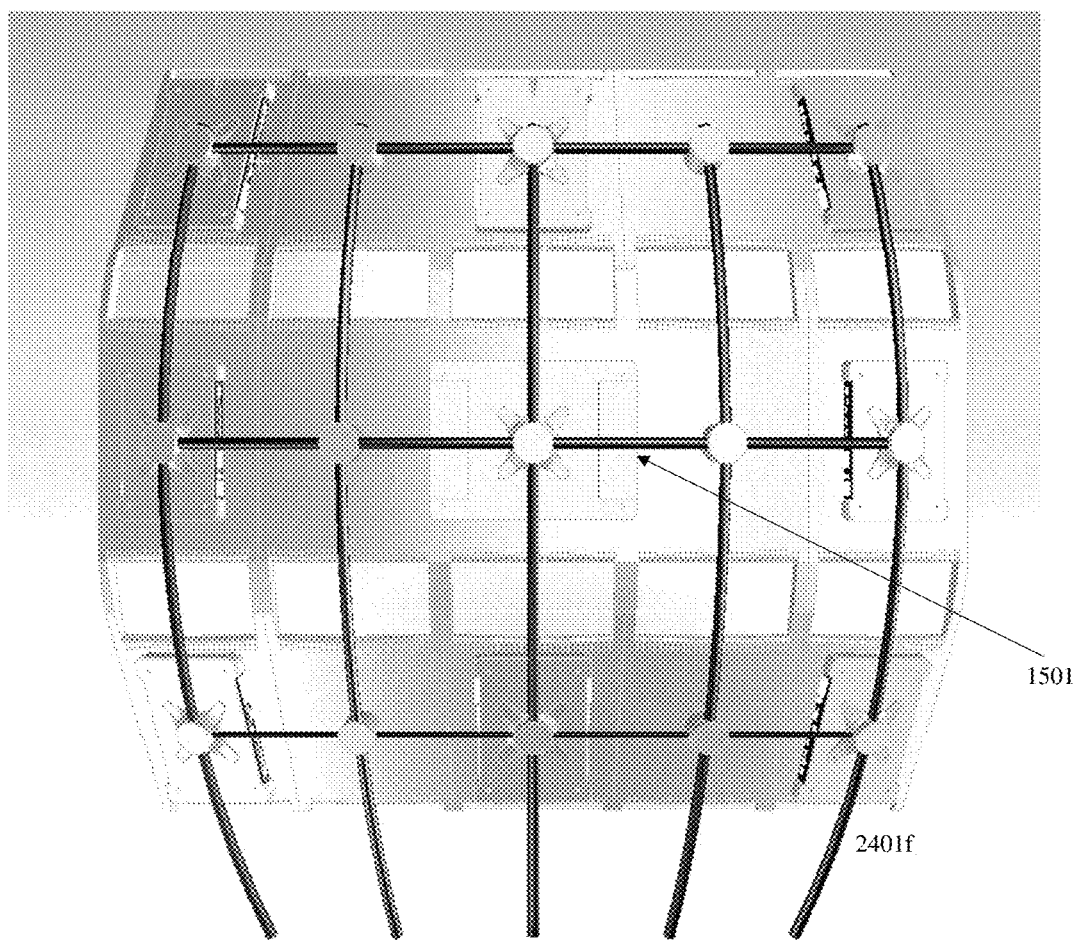
FIG. 27 illustrates a rear view of the vertically and horizontally inclusive immersive digital environment, along with the juxtaposition mounting system, according to an embodiment.

FIG. 27 illustrates an enlarged view of 2401f which is a rear view of the vertically and horizontally inclusive immersive digital environment, along with the juxtaposition mounting system 1501.

Figure 28:
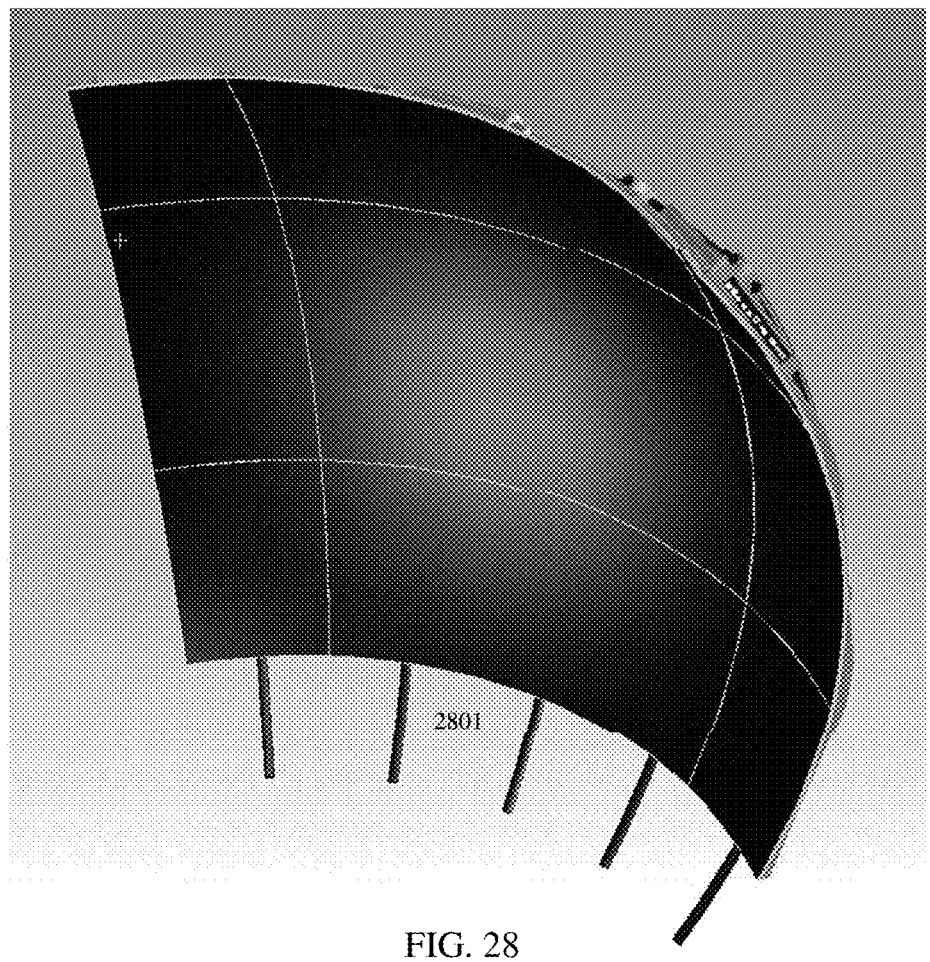
FIG. 28 illustrates an enlarged perspective view of the vertically and horizontally inclusive immersive digital environment, according to an embodiment.

FIG. 28 illustrates an enlarged perspective view of the vertically and horizontally inclusive immersive digital environment.

Figure 29:
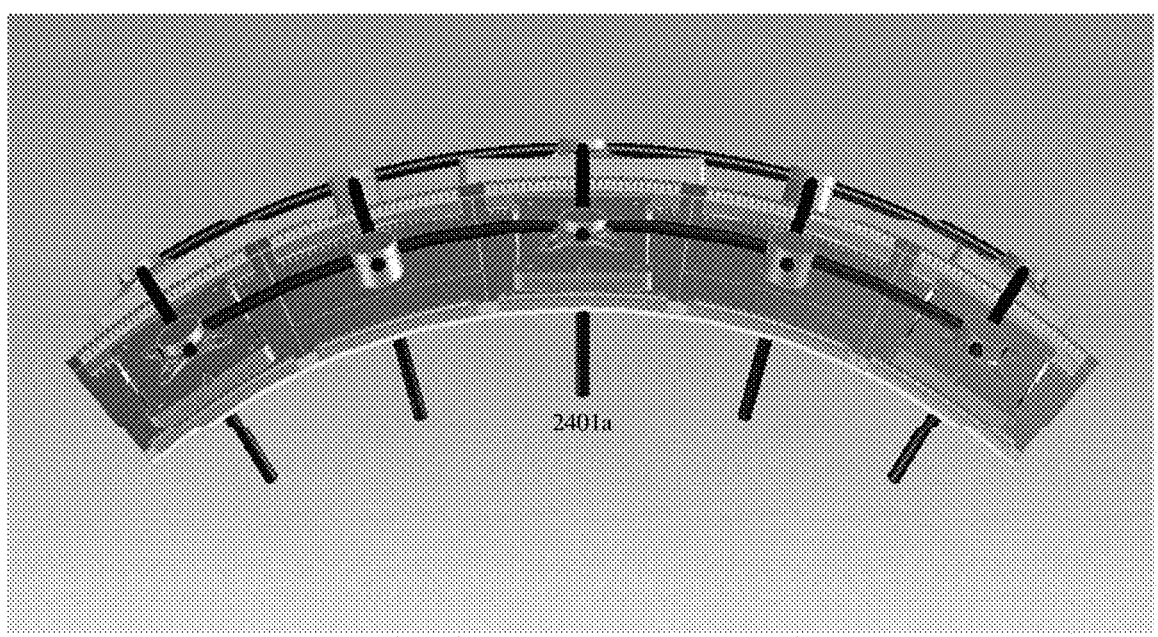
FIG. 29 illustrates a top view of the vertically and horizontally inclusive immersive digital environment, according to an embodiment.

FIG. 29 illustrates an enlarged view of 2401a which is top view of the vertically and horizontally inclusive immersive digital environment.

2.2 Immersive Digital Desktop Display Content Production

Content that has been filmed or produced for a flat display can be modified to match the spherical shape of the Immersive Digital Desktop Display area. UV mapping a 2D image onto a spherical 3D surface is one process that can be employed to deliver spherical content onto the Immersive Digital Desktop Display. Each UV coordinate has a corresponding point in 3D space called a vertice. Combined vertices form edges, edges form faces, faces form polygons that form a spherical display surface. Alternatively, the Immersive Digital Desktop Display can have the same pixel count in each row both vertically and horizontally eliminating the need for UV unwrap processing. With this method, the pixel density will slightly increase delivering enhanced image resolution in regions near the edge of the display. Although these two methods work well in delivering visual media to the display other immersive filmmaking techniques can be employed including, but not limited to: wide angle lens, multiple lens camera rigs to capture spherical content, etc. Spherical content is optimized on the Immersive Digital Desktop Display where the image is filmed or modeled within a sphere or portion of a sphere.

Note that, although separate embodiments are discussed herein, any combination of embodiments and/or partial embodiments discussed herein may be combined to form further embodiments.

3.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the inventive subject matter have been described with reference to numerous specific details that may vary from implementation to implementation. Thus, the sole and exclusive indicator of what is the inventive subject matter, and is intended to be the inventive subject matter, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. An immersive digital desktop display system comprising:
    a digital desktop display comprising:
        an emissive display panel, the emissive display panel configured to attach to a desktop display mount assembly, the emissive display panel having a display surface area with a three-dimensional curvature that is an interior curvature of a rectangular spherical segment based on a set user viewing distance;
        a display controller, the emissive display panel electrically connected to the display controller, the display controller receives input video signals and sends display signals to the emissive display panel.

2. The immersive digital desktop display system of claim 1, wherein the emissive display panel is any of: LED, OLED, PLED, PMOLED, AMOLED, or MicroLED.

3. The immersive digital desktop display system of claim 1,
    wherein the desktop display mount assembly includes an inner display mount surface configured to attach to the emissive display panel, the desktop display mount assembly having attachment points for attaching the desktop display mount assembly to one or more stand mounts.

4. The immersive digital desktop display system of claim 1,
    wherein the desktop display mount assembly includes an inner display mount surface configured to attach to the emissive display panel, the desktop display mount assembly having attachments points for attaching the desktop display mount assembly to a VESA mount.

5. The immersive digital desktop display system of claim 1, further comprising:
    wherein the desktop display mount assembly includes:
        an inner display mount surface configured to attach to the emissive display panel, the desktop display mount assembly having attachment points for attaching the desktop display mount assembly to one or more stand mounts;
        a juxtaposition mounting system configured to mount a left digital desktop display and a right digital desktop display in juxtaposition with the digital desktop display and maintain display surface area sphericality with the digital desktop display.

6. The immersive digital desktop display system of claim 1, further comprising:
    wherein the desktop display mount assembly includes:
        an inner display mount surface configured to attach to the emissive display panel, the desktop display mount assembly having attachment points for attaching the desktop display mount assembly to a VESA mount;
        a juxtaposition mounting system configured to mount a left digital desktop display and a right digital desktop display in juxtaposition with the digital desktop display and maintain display surface area sphericality with the digital desktop display.

7. The immersive digital desktop display system of claim 1, further comprising:
    wherein the desktop display mount assembly includes:
        an inner display mount surface configured to attach to the emissive display panel, the desktop display mount assembly having attachment points for attaching the desktop display mount assembly to one or more stand mounts;
        a juxtaposition mounting system configured to mount an upper digital desktop display and a lower digital desktop display in juxtaposition with the digital desktop display and maintain display surface area sphericality with the digital desktop display;
        wherein the upper digital desktop display includes an upper emissive display panel that has a display surface area with a three-dimensional curvature that is an interior curvature of a rectangular spherical segment based on a set user viewing distance and height of the upper digital desktop display above a user line of sight;
        wherein the lower immersive digital desktop display includes a lower emissive display panel that has a display surface area with a three-dimensional curvature that is an interior curvature of a rectangular spherical segment based on a set user viewing distance and height of the lower digital desktop display above or below the user line of sight.

8. The immersive digital desktop display system of claim 1, further comprising:
    wherein the desktop display mount assembly includes:
        an inner display mount surface configured to attach to the emissive display panel, the desktop display mount assembly having attachment points for attaching the desktop display mount assembly to a VESA mount;
        a juxtaposition mounting system configured to mount an upper digital desktop display and a lower digital desktop display in juxtaposition with the digital desktop display and maintain display surface area sphericality with the digital desktop display;
        wherein the upper digital desktop display includes an upper emissive display panel that has a display surface area with a three-dimensional curvature that is an interior curvature of a rectangular spherical segment based on a set user viewing distance and height of the upper digital desktop display above a user line of sight;
        wherein the lower immersive digital desktop display includes a lower emissive display panel that has a display surface area with a three-dimensional curvature that is an interior curvature of a rectangular spherical segment based on a set user viewing distance and height of the lower digital desktop display above or below the user line of sight.

9. An immersive digital desktop display system comprising:
- a digital desktop display comprising:
  - an emissive display panel, the emissive display panel configured to attach to a desktop display mount assembly, the emissive display panel having a display surface area with a three-dimensional curvature that is an interior curvature of a rectangular toric segment based on a set user viewing distance;
  - a display controller, the emissive display panel electrically connected to the display controller, the display controller receives input video signals and sends display signals to the emissive display panel.

10. The immersive digital desktop display system of claim 9, wherein the emissive display panel is any of: LED, OLED, PLED, PMOLED, AMOLED, or MicroLED.

11. The immersive digital desktop display system of claim 9,
- wherein the desktop display mount assembly includes an inner display mount surface configured to attach to the emissive display panel, the support frame having attachment points for attaching the desktop display mount assembly to one or more stand mounts.

12. The immersive digital desktop display system of claim 9,
- wherein the desktop display mount assembly includes an inner display mount surface configured to attach to the emissive display panel, the desktop display mount assembly having attachment points for attaching the desktop display mount assembly to a VESA mount.

13. The immersive digital desktop display system of claim 9, further comprising:
- wherein the desktop display mount assembly includes:
  - an inner display mount surface configured to attach to the emissive display panel, the support frame having attachment points for attaching the desktop display mount assembly to one or more stand mounts;
  - a juxtaposition mounting system configured to mount a left digital desktop display and a right digital desktop display in juxtaposition with the digital desktop display and maintain display surface area sphericality with the digital desktop display.

14. The immersive digital desktop display system of claim 9, further comprising:
- wherein the desktop display mount assembly includes:
  - an inner display mount surface configured to attach to the emissive display panel, the desktop display mount assembly having attachment points for attaching the desktop display mount assembly to a VESA mount;
  - a juxtaposition mounting system configured to mount a left digital desktop display and a right digital desktop display in juxtaposition with the digital desktop display and maintain display surface area sphericality with the digital desktop display.

15. The immersive digital desktop display system of claim 9, further comprising:
- wherein the desktop display mount assembly includes:
  - an inner display mount surface configured to attach to the emissive display panel, the desktop display mount assembly having attachment points for attaching the desktop display mount assembly to one or more stand mounts;
  - a juxtaposition mounting system configured to mount an upper digital desktop display and a lower digital desktop display in juxtaposition with the digital desktop display and maintain display surface area sphericality with the digital desktop display;
  - wherein the upper digital desktop display includes an upper emissive display panel that has a display surface area with a three-dimensional curvature that is an interior curvature of a rectangular spherical segment based on a set user viewing distance and height of the upper digital desktop display above a user line of sight;
  - wherein the lower immersive digital desktop display includes a lower emissive display panel that has a display surface area with a three-dimensional curvature that is an interior curvature of a rectangular spherical segment based on a set user viewing distance and height of the lower digital desktop display above or below the user line of sight.

16. The immersive digital desktop display system of claim 9, further comprising:
- wherein the desktop display mount assembly includes:
  - an inner display mount surface configured to attach to the emissive display panel, the desktop display mount assembly having attachment points for attaching the desktop display mount assembly to a VESA mount;
  - a juxtaposition mounting system configured to mount an upper digital desktop display and a lower digital desktop display in juxtaposition with the digital desktop display and maintain display surface area sphericality with the digital desktop display;
  - wherein the upper digital desktop display includes an upper emissive display panel that has a display surface area with a three-dimensional curvature that is an interior curvature of a rectangular spherical segment based on a set user viewing distance and height of the upper digital desktop display above a user line of sight;
  - wherein the lower immersive digital desktop display includes a lower emissive display panel that has a display surface area with a three-dimensional curvature that is an interior curvature of a rectangular spherical segment based on a set user viewing distance and height of the lower digital desktop display above or below the user line of sight.

* * * * *